(12) United States Patent
Yamada et al.

(10) Patent No.: US 9,599,316 B2
(45) Date of Patent: Mar. 21, 2017

(54) LIGHT SOURCE DEVICE USING MONOCHROMATIC LIGHT TO EXCITE STATIONARY PHOSPHOR LAYERS

(71) Applicant: MITSUBISHI ELECTRIC CORPORATION, Tokyo (JP)

(72) Inventors: Akihiro Yamada, Tokyo (JP); Tomohiko Sawanaka, Tokyo (JP); Shinji Yagyu, Tokyo (JP); Hiroshi Kida, Tokyo (JP); Kenji Samejima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 71 days.

(21) Appl. No.: 14/414,029

(22) PCT Filed: Aug. 27, 2013

(86) PCT No.: PCT/JP2013/072850
§ 371 (c)(1),
(2) Date: Jan. 9, 2015

(87) PCT Pub. No.: WO2014/038434
PCT Pub. Date: Mar. 13, 2014

(65) Prior Publication Data
US 2015/0167932 A1    Jun. 18, 2015

(30) Foreign Application Priority Data

Sep. 10, 2012    (JP) .................................. 2012-198116

(51) Int. Cl.
*F21V 13/08*    (2006.01)
*G02B 27/10*    (2006.01)
(Continued)

(52) U.S. Cl.
CPC ................ *F21V 13/08* (2013.01); *F21V 9/08* (2013.01); *F21V 9/14* (2013.01); *F21V 13/14* (2013.01);
(Continued)

(58) Field of Classification Search
CPC .............. G03B 21/204; G03B 21/2033; G03B 21/2013; G03B 33/06; G03B 33/08;
(Continued)

(56) References Cited

U.S. PATENT DOCUMENTS 8,382,288 B2 * 2/2013 Narimatsu ......... G03B 21/2013
353/31
2006/0227302 A1 10/2006 Harbers et al.
(Continued)

FOREIGN PATENT DOCUMENTS

CN    102141722 A    8/2011
CN    102141723 A    8/2011
(Continued)

*Primary Examiner* — Sultan Chowdhury
(74) *Attorney, Agent, or Firm* — Birch, Stewart, Kolasch & Birch, LLP

(57) ABSTRACT

A light source device has a first monochromatic light source group, a second monochromatic light source group, a polarization selection and wavelength selection element, a first phosphor layer, and a second phosphor layer. The first monochromatic light source group outputs first polarized light having a fixed polarization direction. The second monochromatic light source group outputs second polarized light having a fixed polarization direction. The first phosphor layer emits light in a first wavelength band. The second phosphor layer emits light in a second wavelength band. The polarization and wavelength selection element directs the first polarized light onto the first phosphor layer by transmitting the first polarized light and directs the second polarized light onto the second phosphor layer by reflecting
(Continued)

the second polarized light, reflects the light in the first wavelength band and transmits the light in the second wavelength band.

20 Claims, 19 Drawing Sheets

(51) Int. Cl.
| | |
|---|---|
| H04N 9/31 | (2006.01) |
| G03B 21/20 | (2006.01) |
| G03B 33/12 | (2006.01) |
| F21V 9/08 | (2006.01) |
| F21V 9/14 | (2006.01) |
| F21V 13/14 | (2006.01) |

(52) U.S. Cl.
CPC ......... *G02B 27/102* (2013.01); *G03B 21/204* (2013.01); *G03B 21/208* (2013.01); *G03B 21/2013* (2013.01); *G03B 21/2073* (2013.01); *G03B 33/12* (2013.01); *H04N 9/3111* (2013.01); *H04N 9/3158* (2013.01); *H04N 9/3164* (2013.01)

(58) Field of Classification Search
CPC .... G03B 33/10; H04N 9/3152; H04N 9/3161; H04N 9/3164; H04N 9/3167
See application file for complete search history.

(56) References Cited

U.S. PATENT DOCUMENTS

| | | |
|---|---|---|
| 2011/0187998 A1 | 8/2011 | Kimura et al. |
| 2011/0187999 A1 | 8/2011 | Hirata et al. |
| 2011/0292349 A1 | 12/2011 | Kitano et al. |
| 2011/0310353 A1* | 12/2011 | Maeda ............... G03B 21/2033 353/31 |
| 2012/0008098 A1 | 1/2012 | Akiyama |
| 2012/0127435 A1 | 5/2012 | Kitano et al. |
| 2012/0133903 A1* | 5/2012 | Tanaka ............... G03B 21/2013 353/31 |
| 2012/0133904 A1 | 5/2012 | Akiyama |
| 2012/0147334 A1 | 6/2012 | Mizushima et al. |
| 2012/0162614 A1* | 6/2012 | Kobayashi ........... H04N 9/3164 353/31 |
| 2012/0182525 A1* | 7/2012 | Imai ................... G03B 21/2033 353/20 |
| 2013/0135593 A1* | 5/2013 | Saitou ................ G03B 21/204 353/31 |
| 2013/0242264 A1 | 9/2013 | Saitou |

FOREIGN PATENT DOCUMENTS

| | | |
|---|---|---|
| CN | 102478754 A | 6/2012 |
| CN | 102483555 A | 6/2012 |
| JP | 04-104120 A | 4/1992 |
| JP | 2001-42431 A | 2/2001 |
| JP | 2006-332042 A | 12/2006 |
| JP | 2008-293838 A | 12/2008 |
| JP | 2010-85740 A | 4/2010 |
| JP | 2011-48044 A | 3/2011 |
| JP | 2011-158502 A | 8/2011 |
| JP | 2012-8549 A | 1/2012 |
| JP | 2012-13977 A | 1/2012 |
| JP | 2012-18208 A | 1/2012 |
| JP | 2012-44189 A | 3/2012 |
| JP | 2012-79622 A | 4/2012 |
| JP | 2012-108486 A | 6/2012 |
| JP | 2012-123948 A | 6/2012 |
| JP | 2012-141411 A | 7/2012 |
| JP | 2012-141495 A | 7/2012 |
| JP | 2012-156182 A | 8/2012 |
| WO | WO 2012/077192 A1 | 6/2012 |

* cited by examiner

LIGHT SOURCE DEVICE USING MONOCHROMATIC LIGHT TO EXCITE STATIONARY PHOSPHOR LAYERS

TECHNICAL FIELD

The present invention relates to a light source device, more particularly to a light source device used in a projection display device.

BACKGROUND ART

The use of LED (light emitting diode) light sources including a plurality of LEDs, or laser light sources including a plurality of laser emitting elements, in place of high pressure mercury lamps or xenon lamps as light sources for projection display devices has recently been proposed.

There is, however, a problem that the temperature dependency of red laser emitting elements, for example, is high, requiring control by a Peltier element or the like, so the cooling mechanism becomes complex. Another problem is that small green laser emitting elements with high output are unavailable. From these problems have come proposals for light source devices using phosphors.

Patent reference 1 discloses a light source device in which excitation light excites a phosphor, and the excited phosphor outputs light (output light) in a certain wavelength band when it returns to its ground state. The excitation light radiated from the excitation light source irradiates a phosphor wheel. The phosphor wheel has a segment area with a phosphor layer that emits light in a red wavelength band, a segment area with a phosphor layer that emits light in a green wavelength band, and a segment area with a phosphor layer that emits light in a blue wavelength band. LEDs or laser emitting elements are used as the excitation light source. A wheel motor spins the phosphor wheel so that the excitation light excites the phosphor of the color in each segment area in turn. Patent reference 1 proposes a light source device that outputs output light of each color (light in the wavelength band of each color) in turn.

PRIOR ART REFERENCE

Patent Reference

Patent reference 1: Japanese Patent Application Publication No. 2010-85740 (paragraphs 0042-0048, FIG. 6)

SUMMARY OF THE INVENTION

Problems to be Solved by the Invention

In the light source device in patent reference 1, however, phosphors of three colors are disposed in segment areas that are placed in a separated arrangement in the circumferential direction of the phosphor wheel. That is, the output light of each color is output at a different time, which constrains the controlled emission of the output light of each color (the light in the wavelength band of each color). Since the period during which output light of each color (light in the wavelength band of each color) is emitted is restricted, that is, control of the amount of emitted light of each color must take place within a restricted emission period. Control of the amount of emitted light of each color in correspondence to the input image is consequently restricted.

An object of the present invention is therefore to provide a light source device that uses a plurality of types of light emitted from a plurality of phosphor layers, mitigates the restrictions on the emission periods, and improves the controllability of the amount of emitted light of each color.

Means for Solving the Problem

A light source device according to one aspect of the present invention has a first monochromatic light source group for outputting first polarized light with a fixed polarization direction, a second monochromatic light source group for outputting second polarized light with a fixed polarization direction, a polarization selection and wavelength selection element, a first phosphor layer for emitting light in a first wavelength band when excited, and a second phosphor layer for emitting light in a second wavelength band when excited. The polarization selection and wavelength selection element directs the first polarized light onto the first phosphor layer by transmitting the first polarized light and directs the second polarized light onto the second phosphor layer by reflecting the second polarized light, and reflects the light in the first wavelength band emitted from the first phosphor layer and transmits the light in the second wavelength band emitted from the second phosphor layer.

Effects of the Invention

According to the present invention, a plurality of types of light emitted from a plurality of phosphor layers are used, the restrictions on the emission periods can be mitigated, and the controllability of the amount of emitted light of each color can be improved.

MODE FOR CARRYING OUT THE INVENTION

A light source device using phosphors is also disclosed in Japanese Patent Application Publication No. 2011-13317 (referred to below as patent reference 2). Patent reference 2 proposes a light source device that outputs light in a green wavelength band and light in a blue wavelength band in turn by means of a matrix arrangement of a plurality of blue laser light sources and a rotating phosphor wheel, and outputs red light from an independent red LED (see, for example, paragraphs 0072-0088 and FIGS. 1, 8, and 9 in patent reference 2).

Since this light source device uses an LED having a large emitting surface and a large scattering angle as a red light source, however, there is a problem of low light utilization efficiency.

Another problem is that the light utilization efficiency of the light source devices in patent reference 1 and patent reference 2 is low because they use a phosphor wheel to output light of different colors at different times, and cannot output light of different colors simultaneously. A further problem is that if the light of each color propagates through the same optical system, differences arise in the focusing efficiency of each color, due to chromatic aberration effects. With the present invention, it is possible to implement a light source device and a projection display device that can mitigate the chromatic aberration effects.

First Embodiment

<Projection Display Device 1>

Figure 1:
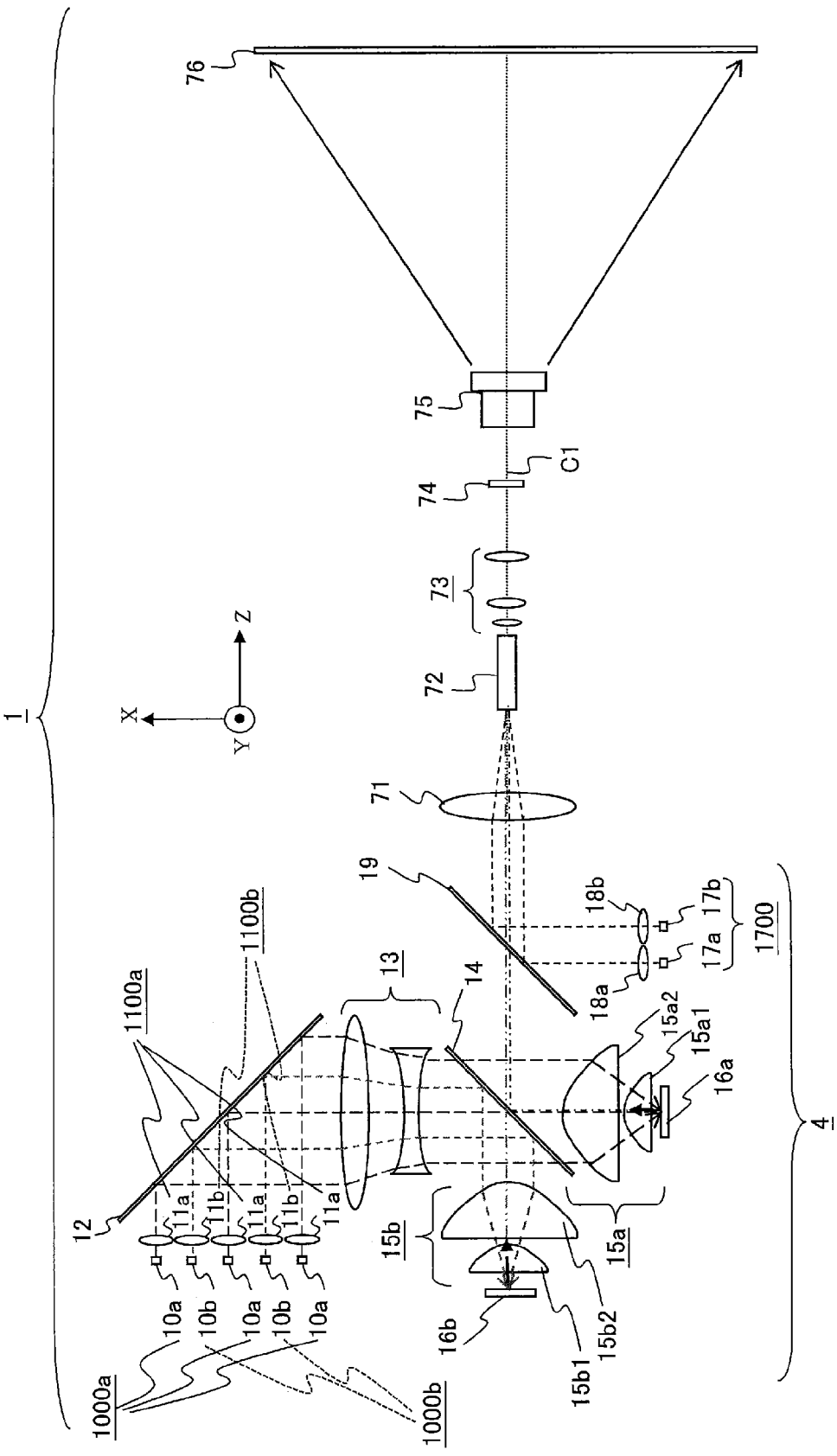
FIG. 1 is a diagram schematically illustrating a configuration of a light source device and a projection display device according to a first embodiment of the invention.

FIG. 1 is a diagram schematically illustrating a configuration of a projection display device 1 including a light source device 4 according to a first embodiment of the invention. To simplify the description, FIG. 1 shows an orthogonal XYZ coordinate system. The X-axis direction is the vertical direction in FIG. 1. The down-to-up direction in FIG. 1 is the positive X-axis direction; the up-to-down direction is the negative X-axis direction. A lens group 13, a light reflecting element 12, first collimating lenses 11a, second collimating lenses 11b, first monochromatic light sources 10a, and second monochromatic light sources 10b are disposed on the positive X-axis side of a polarization selection and wavelength selection element 14. The Y-axis direction is the direction perpendicular to the drawing sheet on which FIG. 1 is depicted. The positive Y-axis direction is the direction from the reverse side (back side) to the front side of the drawing sheet; the negative Y-axis direction is the direction from the front side to the reverse side (back side) of the drawing sheet. The Z-axis direction is the horizontal direction in FIG. 1. The left-to-right direction in FIG. 1 is the positive Z-axis direction; the right-to-left direction is the negative Z-axis direction. A color separation element 19, a focusing lens 71, a light intensity uniformization element 72, a relay lens group 73, an image display element 74, projection optics 75, and a screen 76 are disposed on the positive Z-axis side of the polarization selection and wavelength selection element 14. In the following embodiments, a 'color separation element' is a 'wavelength selection element'.

The projection display device 1 according to the first embodiment includes the light source device 4, the light intensity uniformization element 72, the image display element or a light valve 74, and the projection optics 75 as shown in FIG. 1. The projection display device 1 may also include the focusing lens 71, the relay lens group 73, and the screen 76. Light flux output from the light source device 4 is focused onto an incidence surface 72a of the light intensity uniformization element 72 by the focusing lens 71. After the light intensity is uniformized by the light intensity uniformization element 72, the light flux is output from an exit surface 72b of the light intensity uniformization element 72, passes through the relay lens group 73, then undergoes modulation responsive to an input video signal by the light valve 74, and becomes image light. The image light is enlarged and projected onto the screen 76. FIG. 1 shows an example in which the light valve 74 is a transmissive image display element (e.g., a transmissive liquid crystal display element or the like). When the image display element is a transmissive liquid crystal display element, polarizing plates must be placed on an incidence side and an exit side of the liquid crystal display element, but they are omitted here for convenience. The light valve 74 may be a reflective image display element (e.g., a reflective liquid crystal display element, a digital micromirror device (DMD), or the like). The projection display device 1 may have a rear projection type of configuration in which the screen 76 is transmissive and the displayed image is observed through the screen (from a position on the positive Z-axis side of the screen 76). Alternatively, the projection display device 1 may have a front projection type of configuration in which the displayed image is observed from the front of the screen (from a position on the negative Z-axis side of the screen 76). The shapes and arrangement of the focusing lens 71, the light intensity uniformization element 72, the relay lens group 73, the light valve 74, the projection optics 75, and the screen 76 are not limited to the illustrated example; many variations are possible. The term 'light valve' denotes an image display element. The 'image display element' is an element for converting light into image light. The term 'image light' denotes light carrying image information (i.e., light that has been spatially modulated according to image information). An example using a light valve will be described below.

<Light Source Device 4>

As shown in FIG. 1, the light source device 4 in the first embodiment includes a first monochromatic light source group 1000a, a second monochromatic light source group 1000b, a polarization selection and wavelength selection element (also referred to as a 'polarization selection-wavelength selection element') 14, a first phosphor layer 16a, and a second phosphor layer 16b. The light source device 4 in the first embodiment may further include a first collimating lens group 1100a, a second collimating lens group 1100b, a light reflecting element 12, a lens group 13, a first focusing lens group 15a, and a second focusing lens group 15b. In addition, the light source device 4 in the first embodiment may include third monochromatic light sources 17a, 17b, third collimating lenses 18a, 18b, and a color separation element 19, as shown in FIG. 1.

<First Monochromatic Light Source Group 1000a and Second Monochromatic Light Source Group 1000b>

Figure 2:
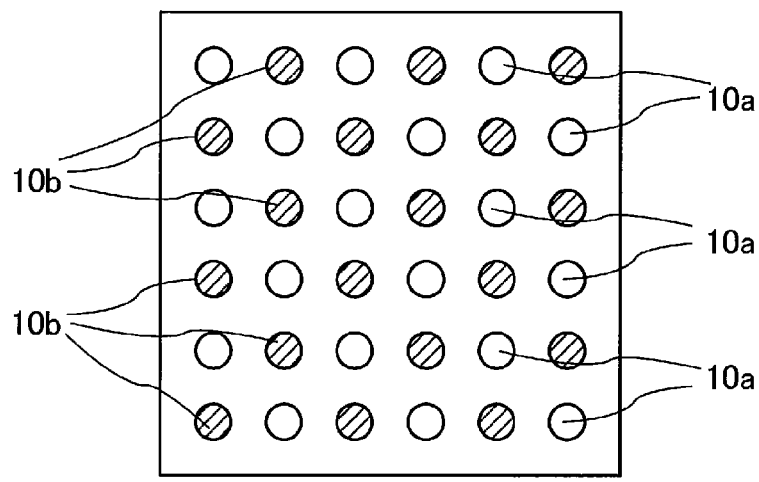
FIG. 2 is a frontal view schematically illustrating the first monochromatic light source group and the second monochromatic light source group in FIG. 1.

FIG. 2 is a frontal view schematically illustrating the first monochromatic light source group 1000a and the second monochromatic light source group 1000b in FIG. 1. The first monochromatic light sources 10a and the second monochromatic light sources 10b in FIG. 2 alternate in two orthogonal directions. The 'two orthogonal directions' are the vertical direction and the horizontal direction in FIG. 2. The first monochromatic light source group 1000a includes a plurality of first monochromatic light sources 10a. The first monochromatic light sources 10a output first polarized light having a fixed polarization direction. The first collimating lens group 1100a includes a plurality of first collimating lenses 11a. The first monochromatic light sources 10a and the first collimating lenses 11a are in one to one correspondence. The light output from the first monochromatic light sources 10a is collimated by the first collimating lenses 11a. Other arrangements of the plurality of first monochromatic light sources 10a may be used. The term 'polarized light' denotes light having a fixed polarization direction; 'light having a fixed polarization direction' is, for example, linearly polarized light whose plane of polarization is limited to a single plane. Linearly polarized light whose plane of polarization is limited to a single plane will be referred to here as polarized light for convenience, but output of elliptically polarized light as well as linearly polarized light is also contemplated. Elliptically polarized light can produce the same effects as linearly polarized light.

The second monochromatic light source group 1000b includes a plurality of second monochromatic light sources 10b. The second monochromatic light sources 10b output second polarized light having a fixed polarization direction. The polarization direction of the second polarized light differs by 90 degrees from the polarization direction of the first polarized light. The second collimating lens group 1100b includes a plurality of second collimating lenses 11b. The second monochromatic light sources 10b and the second collimating lenses 11b are in one to one correspondence. Light output from the second monochromatic light sources 10b is collimated by the second collimating lenses 11b. Other arrangements of the plurality of second monochromatic light sources 10b may also be used.

Each of the plurality of first monochromatic light sources 10a is, for example, a blue laser light emitting element (blue laser diode). Each of the plurality of second monochromatic light sources 10b is, for example, a blue laser light emitting element (blue laser diode). The first embodiment describes a case in which the wavelength band of the light output from the first monochromatic light sources 10a and the wavelength band of the light emitted from the second monochromatic light source 10b are the same. The wavelength band of the light output from the first monochromatic light sources 10a may differ, however, from the wavelength band of the light output from the second monochromatic light sources 10b.

The light (e.g., blue laser light) emitted from the first monochromatic light sources 10a is the first polarized light having a fixed polarization direction. The light (e.g., blue laser light) emitted from the second monochromatic light source 10b is the second polarized light having a fixed polarization direction. The polarization direction of the first polarized light differs by 90 degrees from the polarization direction of the second polarized light. For example, the first polarized light incident on the polarization selection and wavelength selection element 14 is p-polarized light and the second polarized light is s-polarized light.

<First Collimating Lens Group 1100a and Second Collimating Lens Group 1100b>

The first collimating lens group 1100a includes the plurality of first collimating lenses 11a. The first monochromatic light sources 10a and the first collimating lenses 11a are in one to one correspondence. The light output from the first monochromatic light sources 10a is collimated by the first collimating lenses 11a.

The second collimating lens group 1100b includes the plurality of second collimating lenses 11b. The second monochromatic light sources 10b and the second collimating lenses 11b are in one to one correspondence. The light output from the second monochromatic light sources 10b is collimated by the second collimating lenses 11b.

The first collimating lens group 1100a and the second collimating lens group 1100b may each be a single unitary lens array. If the first collimating lens group 1100a and the second collimating lens group 1100b are each a single unitary lens array, it is possible to mitigate the reduction in light utilization efficiency caused by installation variations of the first collimating lenses 11a and the second collimating lenses 11b. Here, 'installation variations' denotes variations in the positions of parts determined by their machining tolerances or assembly tolerances. 'Installation variations' are caused by lens eccentricity etc. 'Eccentricity' means that an optical axis of a lens or an optical element deviates from an intended optical axis. Eccentricity includes eccentricity (decentering) arising from an offset of an optical axis of a lens or an optical element in a plane perpendicular to an ideal optical axis, and eccentricity (tilt) arising when an optical axis of a lens or an optical element is inclined from or rotated with respect to an ideal optical axis. When plastic is used to form the first collimating lens group 1100a and the second collimating lens group 1100b as single unitary lens arrays, for example, installation variations of the first collimating lenses 11a and the second collimating lenses 11b can be suppressed by mold precision and forming precision.

<Light Reflecting Element 12>

The light reflecting element 12 bends the light path of the first polarized light that has been output from the first monochromatic light sources 10a and has passed through the first collimating lenses 11a by 90 degrees. The light reflecting element 12 also bends the light path of the second polarized light that has been output from the second monochromatic light sources 10b and has passed through the second collimating lenses 11b by 90 degrees. The light reflecting surface of the light reflecting element 12 is preferably formed with, for example, a silver coating that can efficiently reflect blue light. In FIG. 1, it is also possible to make the first polarized light and the second polarized light incident on the lens group 13 without using the light reflecting element 12 or bending their light paths. The size of the light source device 4 can thereby be reduced by shortening its length in the X-axis direction.

<Lens Group 13>

The lens group 13 has functions such as, for example, collimating and reducing the diameter of the light flux from the light reflecting element 12. The lens group 13 includes, for example, a first lens and a second lens. The configuration of the lens group 13, however, is not limited to the example shown in FIG. 1. The lens group 13 may consist of a single lens. The lens group 13 may also consist of three or more lenses. The light source device 4 may be configured without the lens group 13. The following embodiments show optical elements for reducing the diameter of the light flux as the lens group.

<First Focusing Lens Group 15a and Second Focusing Lens Group 15b>

The first focusing lens group 15a focuses the first polarized light in combination with the lens group 13, for example. The first focusing lens group 15a includes a first focusing lens 15a1 and a second focusing lens 15a2. The configuration of the first focusing lens group 15a, however, is not limited to the example shown in FIG. 1. The first focusing lens group 15a may consist of a single lens. The first focusing lens group 15a may also consist of three or more lenses. Allowing for a single or multiple-lens configuration, the first focusing lens group 15a may be denoted as a first focusing element 15a.

The second focusing lens group 15b focuses the second polarized light in combination with the lens group 13. The second focusing lens group 15b includes a first focusing lens 15b1 and a second focusing lens 15b2. The configuration of the second focusing lens group 15b, however, is not limited to the example shown in FIG. 1. The second focusing lens group 15b may consist of a single lens. The second focusing lens group 15b may also consist of three or more lenses. Allowing for a single or multiple-lens configuration, the second focusing lens group 15b may be denoted as a second focusing element 15b.

<First Phosphor Layer 16a and Second Phosphor Layer 16b>

The first phosphor layer 16a receives the first polarized light as excitation light. The first phosphor layer 16a is excited by the first polarized light and thereby emits light in a first wavelength band. The light in the first wavelength band is, for example, light in a red wavelength band.

The second phosphor layer 16b receives the second polarized light as excitation light. The second phosphor layer 16b is excited by the second polarized light and thereby emits light in a second wavelength band. The light in the second wavelength band is, for example, light in a green wavelength band.

<Polarization Selection and Wavelength Selection Element 14>

Figure 3A:
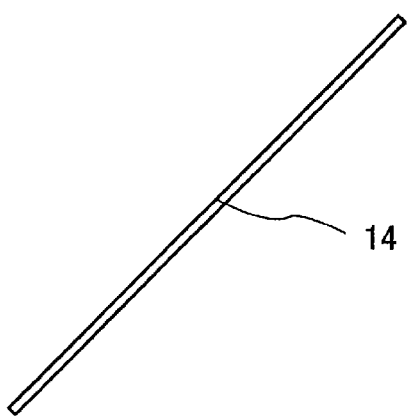
FIGS. 3(*a*) and 3(*b*) are a side view and a frontal view schematically illustrating the shape of the polarization selection and wavelength selection element in FIG. 1.
Figure 3B:
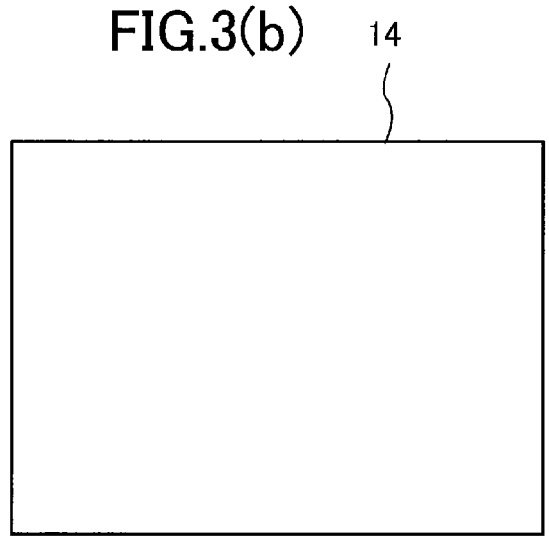

FIGS. 3(a) and 3(b) are a side view and a frontal view schematically illustrating the shape of the polarization selection and wavelength selection element 14 in FIG. 1. FIG. 3(a) is the side view. FIG. 3(b) is the frontal view. The polarization selection and wavelength selection element 14 has a polarization selection function and a wavelength selection function. The 'polarization selection function' is a function that reflects or transmits light according to the direction of polarization of the light. The 'wavelength selection function' is a function that reflects or transmits light according to the wavelength of the light. Precisely speaking, the polarization selection and wavelength selection element 14 has property of transmitting p-polarized light and reflecting s-polarized light (a polarization selection function) and property of separating colors formed in a multilayer dielectric film (a wavelength selection function).

The polarization selection and wavelength selection element 14 transmits the first polarized light by means of its polarization selection function. The first focusing lens group 15a collects the first polarized light and directs the collected light onto the first phosphor layer 16a. The polarization selection and wavelength selection element 14 reflects the second polarized light by means of its polarization selection function. The second focusing lens group 15b collects the second polarized light and directs the collected light onto the second phosphor layer 16b.

The polarization selection and wavelength selection element 14 uses its wavelength selection function to reflect the light in the first wavelength band emitted from the first phosphor layer 16a. The polarization selection and wavelength selection element 14 uses its wavelength selection function to transmit the light in the second wavelength band emitted from the second phosphor layer 16b.

Figure 4:
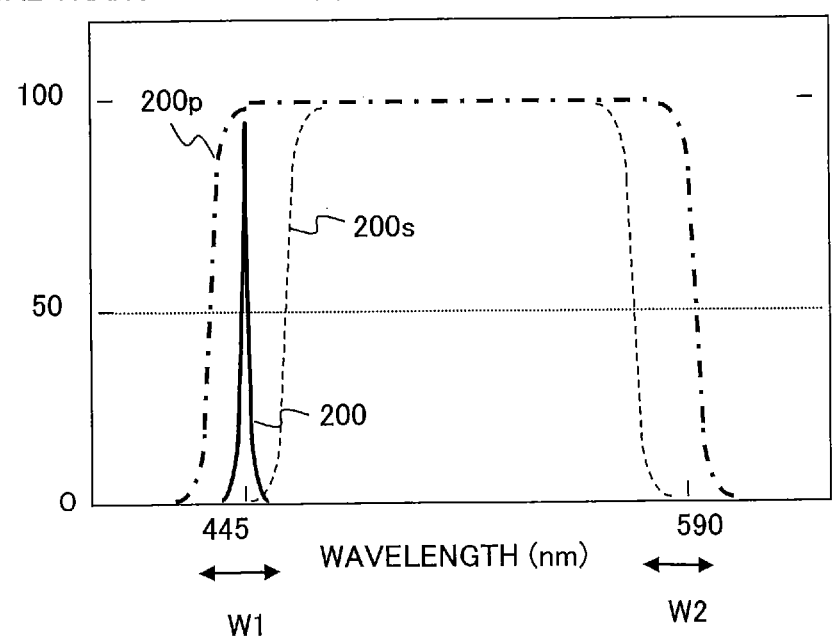
FIG. 4 is a diagram illustrating polarization separation characteristics and wavelength separation characteristics of the polarization selection and wavelength selection element in FIG. 1.

FIG. 4 is a schematic diagram illustrating optical transmission characteristics of the polarization selection and wavelength selection element 14 with respect to wavelength. In FIG. 4, the horizontal axis represents wavelength [nm] of light and the vertical axis represents optical transmittance [%]. A curve 200p represents the optical transmission characteristic for p-polarized light incident on the polarization selection and wavelength selection element 14. The curve 200p is shown by a dot-dash line. A curve 200s represents the optical transmission characteristic for s-polarized light incident on the polarization selection and wavelength selection element 14. The curve 200s is shown by a dotted line.

As indicated by the curves 200p and 200s, the polarization selection and wavelength selection element 14 has different optical transmission characteristics for p-polarized light and s-polarized light. For example, the curve 200p in FIG. 4 shows the optical transmittance increasing from a wavelength of 430 nm (more precisely speaking, near 430 nm), and becoming 100% at a wavelength of 445 nm (more precisely speaking, near 445 nm). The curve 200p also shows the optical transmittance decreasing from a wavelength of 595 nm (more precisely speaking, near 595 nm) and becoming 0% at a wavelength of 610 nm (more precisely speaking, near 610 nm). The curve 200s shows the optical transmittance increasing from a wavelength of 445 nm (more precisely speaking, near 445 nm), and becoming 100% at a wavelength of 460 nm (more precisely speaking, near 460 nm). The curve 200s also shows the optical transmittance decreasing from a wavelength of 575 nm (more precisely speaking, near 575 nm) and becoming 0% at a wavelength of 590 nm (more precisely speaking, near 590 nm). Here, the expression 'more precisely speaking' indicates that variations in characteristics that occur when actual parts are manufactured are taken into consideration. The same applies to the following description.

This difference in optical transmission characteristics causes light in wavelength bands W1 and W2 indicated by double-headed arrows in FIG. 4 to be transmitted if the light is p-polarized and reflected if the light is s-polarized. That is, the polarization selection and wavelength selection element 14 can be used as a polarization selection element for light in the wavelength bands W1 and W2 indicated by the double-headed arrows in FIG. 4. The polarization selection and wavelength selection element 14 can also be used as a wavelength selection element (a color band filter) for light of wavelengths other than the wavelength bands W1 and W2 indicated by the double-headed arrows in FIG. 4. In FIG. 4, the wavelength band W1 is a band from 440 nm to 450 nm (more precisely speaking, a band from approximately 440 nm to approximately 450 nm). The wavelength band W2 is a band from 585 nm to 600 nm (more precisely speaking, a band from approximately 585 nm to approximately 600 nm). The wavelength band W2 on the longer wavelength side is generally wider than the wavelength band W1 on the shorter wavelength side here. In the wavelength band W1 from 440 nm to 450 nm, for example, the optical transmittance of p-polarized light is 90% or more and the optical reflectance of s-polarized light is 90% or more. Characteristics at wavelengths less than 440 nm do not matter. For example, at 425 nm, the optical transmittance of p-polarized light may be 30% and the optical reflectance of s-polarized light may be 60%. What matters is the wavelength band for which the polarization selection function is used. Here, the optical transmittance and optical reflectance characteristics for polarized light in the range from 440 nm to 450 nm are important. In the wavelength band W2 this embodiment uses the wavelength selection function but does not use the polarization selection function, so the wavelength band W2 is less important, as long as polarized light of red wavelengths is reflected. If the wavelength band W2 extends from 585 nm to 600 nm, that is, the reflectance of light of wavelengths longer than 600 nm is preferably high regardless of the polarization direction.

The blue laser light used for excitation is indicated by a curve 200 in FIG. 4. Since the curve 200 indicates laser light, it has a relatively narrow wavelength band. In FIG. 4, the wavelength band of the blue laser light used for excitation is, for example, the band from 444 nm to 446 nm. FIG. 4 illustrates the characteristics of the polarization selection and wavelength selection element 14 when the first phosphor layer 16a outputs light in the red wavelength band and the second phosphor layer 16b outputs light in the green wavelength band. FIG. 4 shows an example in which the center wavelength of the first polarized light from the first monochromatic light sources 10a is 445 [nm] and the center wavelength of the second polarized light from the second monochromatic light sources 10b is also 445 [nm]. However, it is also possible to use light sources with a center wavelength of 465 [nm] as the first monochromatic light sources 10a and the second monochromatic light sources 10b. In this case, it suffices for the curve 200s of the polarization selection and wavelength selection element 14 to be reflective below 470 nm and the curve 200p to be reflective below 460 nm. That is, 90% or more of the p-polarized light should be transmitted and 90% or more of the s-polarized light should be reflected in the wavelength band from 460 nm to 470 nm.

The light transmitted through the polarization selection and wavelength selection element 14 is focused onto the first phosphor layer 16a by the first focusing lens group 15a. The light reflected by the polarization selection and wavelength selection element 14 is focused onto the second phosphor layer 16b by the second focusing lens group 15b. The first focusing lens group 15a and the second focusing lens group 15b are preferably of different design here. If the lenses 15a1 and 15b1 are spherical lenses and the lenses 15a2 and 15b2 are aspherical lenses, for example, thicknesses, curvatures, and positions of the lenses 15a1 and 15b1 nearest the phosphor layers 16a and 16b, respectively, are designed corresponding to the color of light excited from the phosphor layers 16a and 16b. The lens 15a1 is the lens nearest the first phosphor layer 16a. The lens 15b1 is the lens nearest the second phosphor layer 16b. The lens 15a2 is the lens second nearest the first phosphor layer 16a. The lens 15b2 is the lens second nearest the second phosphor layer 16b. This reduces chromatic aberration, and can therefore increase the efficiency with which the light is focused onto the light intensity uniformization element 72. The second nearest lenses 15a2 and 15b2 are aspherical lenses, so from the viewpoint of cost, it is preferable that they be shared. In this case, for the second nearest lenses 15a2 and 15b2 it is preferable to select a low-dispersion glass material. The term 'low-dispersion' means that the Abbe number is large. The term 'low-dispersion' also means that the wavelength dependency of the refractive index is small.

The first phosphor layer 16a is excited by the excitation light to emit light in the red wavelength band. The second phosphor layer 16b is excited by the excitation light to emit light in the green wavelength band. The case of excitation by blue laser light is described here. That is, the excitation light is blue laser light.

<Third Monochromatic Light Sources 17a, 17b and Third Collimating Lenses 18a, 18b>

The third monochromatic light sources 17a and 17b are, for example, blue laser light sources. The third collimating lenses 18a and 18b output light that are output from the third monochromatic light sources 17a and 17b, respectively, as collimated light fluxes.

<Color Separation Element 19>

The color separation element 19 is formed as, for example, a multilayer dielectric film. The color separation element 19 has the property of transmitting the colors red and green and reflecting the color blue. The light from the third monochromatic light sources 17a, 17b is reflected by the color separation element 19. The light from the third monochromatic light sources 17a, 17b is then focused by the focusing lens 71 onto the light intensity uniformization element 72. The light incident from the polarization selection and wavelength selection element 14 onto the color separation element 19 is transmitted through the color separation element 19. The light incident from the polarization selection and wavelength selection element 14 onto the color separation element 19 is then focused by the focusing lens 71 onto the light intensity uniformization element 72.

<Light Intensity Uniformization Element 72>

Figure 5:
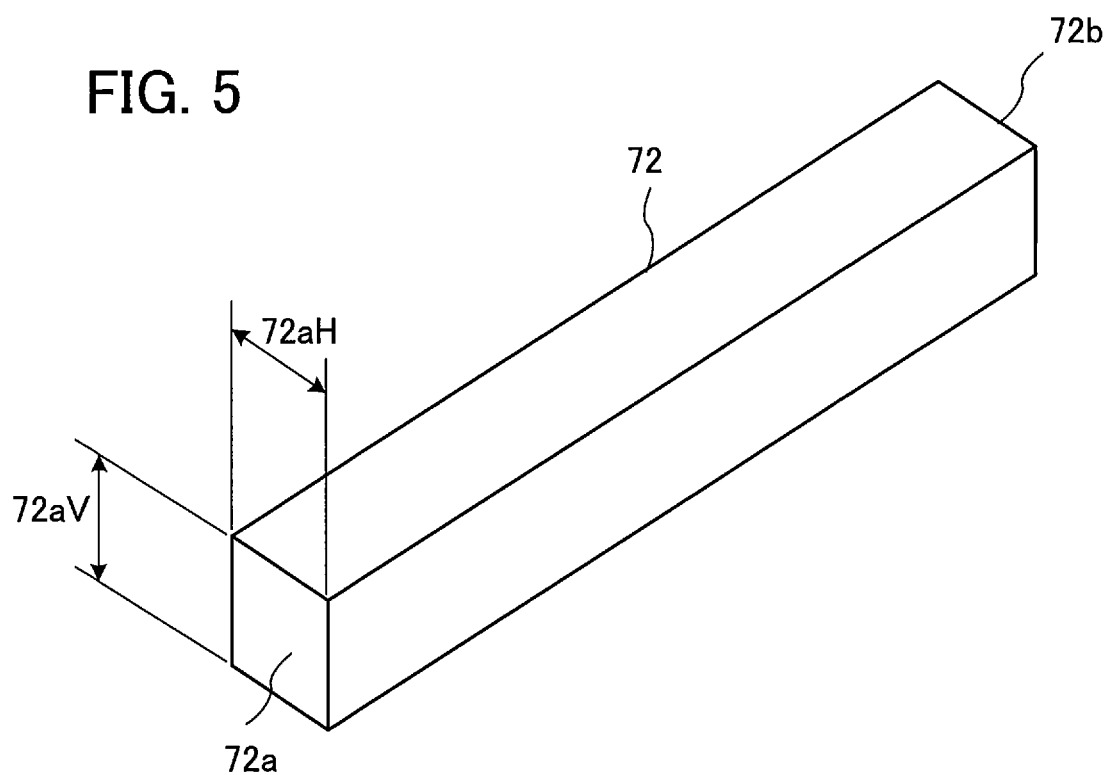
FIG. 5 is a perspective view schematically illustrating a light intensity uniformization element in FIG. 1.

The light fluxes output from the phosphor layers 16a and 16b and the third monochromatic light sources 17a and 17b are focused by the focusing lens 71 onto the light intensity uniformization element 72. FIG. 5 is a perspective view of the light intensity uniformization element 72. As shown in FIG. 5, the light intensity uniformization element 72 uniformizes the light intensity of light entering from the incidence surface 72a, in the cross section of the light flux. 'In the cross section of the light flux' means in a plane orthogonal to the optical axis C1 of the light intensity uniformization element 72. To 'uniformize the light intensity' is to reduce illuminance irregularities. The light intensity uniformization element 72 outputs a light flux with a uniformized light intensity from its exit surface 72b. That is, the light intensity uniformization element 72 has the function of uniformizing the light intensity of the incident light flux within a plane orthogonal to the optical axis C1 and outputting the resultant light flux.

The light intensity uniformization element 72 is generally made from glass, plastic, or some other transparent material. One possible light intensity uniformization element 72 is a polygonal columnar rod configured to have totally reflecting inside walls. That is, it is a columnar member whose plane cross section orthogonal to the optical axis C1 is a polygon.

Another possible light intensity uniformization element 72 is a pipe (tubular member) with a polygonal cross sectional shape built with light reflecting surfaces on the inside. When the light intensity uniformization element 72 is a polygonal columnar rod, the light intensity uniformization element 72 reflects incident light multiple times by using the total reflection effect at the interface between the transparent material and air, and then outputs the light from the exit surface 72b. When the light intensity uniformization element 72 is a pipe with a polygonal cross section, the light intensity uniformization element 72 reflects incident light multiple times by using the reflective effect of inwardly facing surface mirrors, and then outputs the light from the exit surface 72b. The light intensity uniformization element 72 can internally reflect light multiple times if it has an appropriate length in the direction of propagation of the light flux. The light that has been internally reflected multiple times floods the exit surface 72b of the light intensity uniformization element 72. This provides a uniform light intensity distribution on the exit surface 72b of the light intensity uniformization element 72.

<Relay Lens Group 73>

After its intensity has been uniformized in the light intensity uniformization element 72, the light flux is guided through the relay lens group 73 to the light valve 74. Here the relay lens group 73 in FIG. 1 has a three-lens configuration, but this is not a limitation. The relay lens group 73 may be configured with four lenses and may use aspherical lenses. Besides lenses, the relay lens group 73 may be configured to use flat mirrors and curved mirrors to guide the light flux to the light valve 74.

<Light Valve 74>

The light valve 74 is, for example, a liquid crystal light valve or a DMD. In relation to the light valve 74, in paragraph 0005 and FIG. 13 in publication WO 2005/026835 (referred to below as patent reference 3), a projection display device using a liquid crystal light valve uses a first lens array and a second lens array with a plurality of lens cells arranged in a matrix to uniformize the light intensity and provides a polarization conversion element in the stage following the second lens array to align the polarization direction, thereby increasing the light utilization efficiency. In the projection display device 1 as shown in FIG. 1, however, which uses the light intensity uniformization element 72 that does not have the function of aligning polarization directions, because in particular of the non-aligned polarization directions of red light flux and green light flux, judged from the viewpoint of increasing light utilization efficiency, use of a DMD is preferable. The first embodiment shows a single DMD but three DMDs may be used. In that case, the first embodiment makes it possible to keep red light, green light, and blue light turned on at all times, suppressing the reduction in brightness due to the effect of time division driving of the DMD.

<Effects>

As described above, the light source device 4 and the projection display device 1 according to the first embodiment use the polarization selection and wavelength selection element 14 to separate the laser light from the blue laser light emitting elements that form the light source for excitation. If the blue laser light emitting elements are turned on constantly, it becomes possible to output red light and green light constantly. If the blue laser light emitting elements with different polarizations are turned on selectively, quantities of light of each color can be output according to the input image. Consequently, the effect of improved light utilization efficiency can be obtained from the light source device 4 and the projection display device 1.

The focusing lens groups for the first phosphor layer 16a and the second phosphor layer 16b can be independent, so they can be designed for the colors red and green. The light source device 4 and the projection display device 1 can therefore produce the effect of enhanced efficiency in concentrating light onto the light intensity uniformization element 72.

<Variations>

Figure 6:
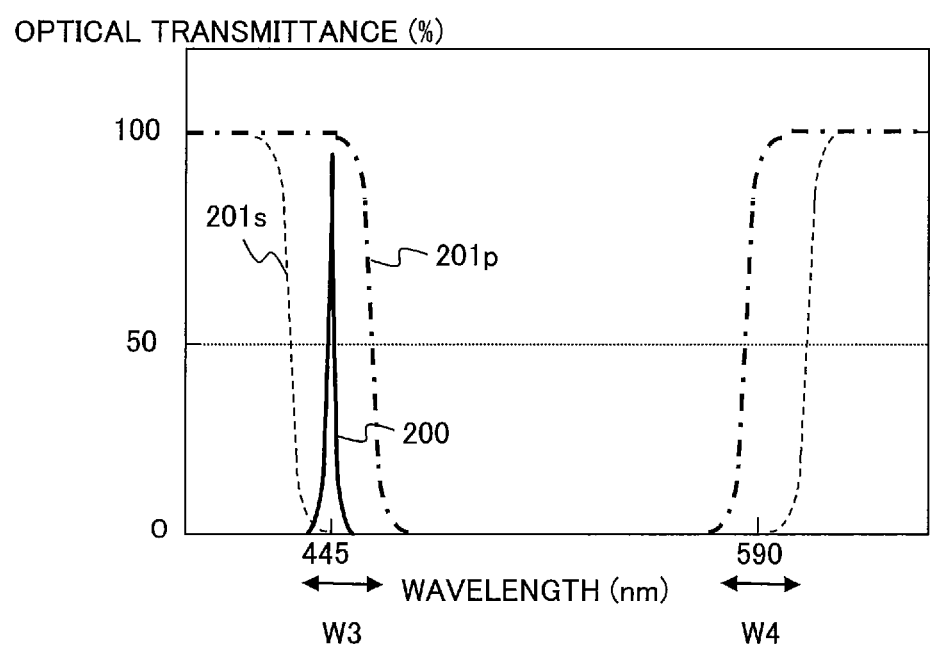
FIG. 6 is a diagram illustrating polarization separation characteristics and wavelength separation characteristics of another polarization selection and wavelength selection element that can be used in the first embodiment.

FIG. 6 is a schematic diagram showing another example of the optical transmission characteristics of the polarization selection and wavelength selection element 14 with respect to wavelength. In FIG. 6, the horizontal axis represents wavelength [nm] of light and the vertical axis represents optical transmittance [%]. A curve 201p represents the optical transmission characteristic for p-polarized light incident on the polarization selection and wavelength selection element 14. A curve 201s represents the optical transmittance characteristic for s-polarized light incident on the polarization selection and wavelength selection element 14.

As indicated by the curves 201p and 201s, the polarization selection and wavelength selection element 14 has different optical transmission characteristics for p-polarized light and s-polarized light. For example, the curve 201s in FIG. 6 shows the optical transmittance decreasing from a wavelength of 430 nm (more precisely speaking, near 430 nm), and becoming 0% at a wavelength of 445 nm (more precisely speaking, near 445 nm). The curve 201s also shows the optical transmittance increasing from a wavelength of 595 nm (more precisely speaking, near 595 nm) and becoming 100% at a wavelength of 610 nm (more precisely speaking, near 610 nm). The curve 201p shows the optical transmittance decreasing from a wavelength of 445 nm (more precisely speaking, near 445 nm), and becoming 0% at a wavelength of 460 nm (more precisely speaking, near 460 nm). The curve 201p also shows the optical transmittance increasing from a wavelength of 575 nm (more precisely speaking, near 575 nm) and becoming 100% at a wavelength of 590 nm (more precisely speaking, near 590 nm).

This difference in optical transmission characteristics causes light in wavelength bands W3 and W4 indicated by double-headed arrows in FIG. 6 to be transmitted through the polarization selection and wavelength selection element 14 if the light is p-polarized light and reflected by the polarization selection and wavelength selection element 14 if the light is s-polarized light. That is, the polarization selection and wavelength selection element 14 can be used as a polarization selection element for light in the wavelength bands W3 and W4 indicated by the double-headed arrows in FIG. 6. The polarization selection and wavelength selection element 14 can also be used as a wavelength selection element (a color band filter) for light of wavelengths other than the wavelength bands W3 and W4 indicated by the double-headed arrows in FIG. 6.

In FIG. 6, the wavelength band W3 is a band from 440 nm to 450 nm (more precisely speaking, a band from approximately 440 nm to approximately 450 nm); the wavelength band W4 is a band from 585 nm to 600 nm (more precisely speaking, a band from approximately 585 nm to approximately 600 nm). The wavelength band W4 on the longer wavelength side is generally wider than the wavelength W3 on the shorter wavelength side here. In the wavelength band W3 from 440 nm to 450 nm, for example, the optical transmittance of p-polarized light is 90% or more and the reflectance of s-polarized light is 90% or more. Characteristics at wavelengths less than 440 nm do not matter. For example, at 425 nm, the optical transmittance of p-polarized light may be 60% and the reflectance of s-polarized light may be 30%. What matters here is the optical transmittance and reflectance characteristics for polarized light in the range from 440 nm to 450 nm, in which the polarization selection function is used.

Since this embodiment uses the wavelength selection function but does not use the polarization selection function, the wavelength band W4 is less important, as long as polarized light of a red wavelength is transmitted. If the wavelength band W4 extends from 585 nm to 600 nm, the transmittance of light of wavelengths longer than 600 nm is preferably high regardless of the polarization direction.

The blue laser light used for excitation is indicated by a curve 200 in FIG. 6. Since the curve 200 indicates laser light, it has a relatively small wavelength band. In FIG. 6, the wavelength band of the blue laser light used for excitation is, for example, from 444 nm to 446 nm. FIG. 6 illustrates the characteristics of the polarization selection and wavelength selection element 14 when the first phosphor layer 16a outputs light in the green wavelength band and the second phosphor layer 16b outputs light in the red wavelength band. FIG. 6 shows an example in which the center wavelength of the first polarized light from the first monochromatic light sources 10a is 445 [nm] and the center wavelength of the second polarized light from the second monochromatic light sources 10b is also 445 [nm]. However, it is also possible to use light sources with a center wavelength of 465 [nm] as the first monochromatic light sources 10a and the second monochromatic light sources 10b. In this case, it suffices for the curve 201p of the polarization selection and wavelength selection element 14 to be transmissive below 470 nm and the curve 201s to be transmissive below 460 nm. That is, 90% or more of the p-polarized light should be transmitted and 90% or more of the s-polarized light should be reflected in the wavelength band from 460 nm to 470 nm.

The first embodiment shows a case in which the first phosphor layer 16a and the second phosphor layer 16b are coated onto flat plates. The first phosphor layer 16a and the second phosphor layer 16b may, however, be coated onto rotary plates turned by a driving force of a motor or the like. In this configuration, the first phosphor layer 16a is coated onto a first rotary plate and the second phosphor layer 16b is coated onto a second rotary plate. When the first phosphor layer 16a is coated onto a stationary flat plate and the second phosphor layer 16b is coated onto another stationary flat plate, a heat sink or some other type of cooling structure is generally provided on the rear surface of each of the first phosphor layer 16a and the second phosphor layer 16b. When the first rotary plate and the second rotary plate are used, however, the cooling structure may be omitted. This is because when a rotary plate is used, the position of light irradiation is constantly changing, which mitigates an increase in the temperature of the phosphor. The use of a stationary flat plate provided with the first phosphor layer 16a and another stationary flat plate provided with the second phosphor layer 16b, instead of rotary plates, however, has the advantage of being unaffected by the vibration noise, service life, and so on of the motors.

In the first embodiment, the third monochromatic light sources 17a and 17b are blue laser emitting elements, but they may be blue LEDs. In this case, however, since an LED has a wide light divergence angle, it is necessary for the third collimating lens 18a and the third collimating lens 18b to be aspherical lenses or for the number of lenses to be increased. Alternatively, they must be aspherical lenses as used for the first focusing lens groups 15a and 15b, in order to collimate the light flux.

The light source device 4 includes the first monochromatic light source group 1000a, the second monochromatic light source group 1000b, the polarization selection and wavelength selection element 14, the first phosphor layer 16a, and the second phosphor layer 16b. The first monochromatic light source group 1000a outputs the first polarized light having a fixed polarization direction. The second monochromatic light source group 1000b outputs the second polarized light having a fixed polarization direction. When excited, the first phosphor layer 16a outputs light in the first wavelength band. When excited, the second phosphor layer 16b outputs light in the second wavelength band. The polarization selection and wavelength selection element 14 transmits the first polarized light to direct the first polarized light onto the first phosphor layer 16a and reflects the second polarized light to direct the second polarized light onto the second phosphor layer 16b. The polarization selection and wavelength selection element 14 reflects the light in the first wavelength band emitted from the first phosphor layer 16a and transmits the light in the second wavelength band emitted from the second phosphor layer 16b.

The second polarized light has a polarization direction differing by 90 degrees from the polarization direction of the first polarized light.

The light source device 4 includes the first focusing lens element 15a disposed on the light path of the first polarized light between the polarization selection and wavelength selection element 14 and the first phosphor layer 16a, and the second focusing lens element 15b disposed on the light path of the second polarized light between the polarization selection and wavelength selection element 14 and the second phosphor layer 16b. As noted above, allowing for either single or multiple-lens configurations etc., the focusing lens groups 15a and 15b may be described as the focusing elements 15a and 15b.

The light source device 4 has a third monochromatic light source group 1700 and the color separation element 19. The third monochromatic light source group 1700 outputs light in a third wavelength band. The color separation element 19 brings the light path of light in the third wavelength band into coincidence with the common light path shared by the light path of the light in the first wavelength band that has been reflected by the polarization selection and wavelength selection element 14 and the light path of the light in the second wavelength band that has been transmitted through the polarization selection and wavelength selection element 14.

The first polarized light is p-polarized light at the time of incidence on the polarization selection and wavelength selection element 14; the second polarized light is s-polarized light at the time of incidence on the polarization selection and wavelength selection element 14.

The first polarized light is blue laser light; the second polarized light is blue laser light.

The first focusing lens element 15a and the second focusing lens element 15b have different optical characteristics.

The light source device 4 further includes the optical element 13, disposed on a common path shared by the light path of the first polarized light between the first monochromatic light source group 1000a and the polarization selection and wavelength selection element 14 and the light path of the second polarized light between the second monochromatic light source group 1000b and the polarization selection and wavelength selection element 14, for reducing the flux diameter of the first polarized light and the flux diameter of the second polarized light. In the embodiment, the optical element for reducing the light flux diameters is shown as a lens group.

Of the light in the first wavelength band and the light in the second wavelength band, one is red light and the other is green light. The light in the first wavelength band is the light emitted by the first phosphor layer 16a. The light in the second wavelength band is the light emitted by the second phosphor layer 16b.

The projection display device 1 includes the light source device 4, the light intensity uniformization element 72, the light valve 74, and the projection optics 75. The light intensity uniformization element 72 uniformizes the intensity of the light from the light source device 4. The light valve 74 changes the uniformized light generated by the light intensity uniformization element 72 to image light. The projection optics 75 enlarge and project the image light generated by the light valve 74.

The projection display device 1 may further include the screen 76 onto which the image light is projected by the projection optics 75. This type of projection display device 1 is referred to as, for example, a rear projection television. A rear projection television is a large-sized television that uses a built-in projector to display an image by projecting it onto a rear surface of a screen that looks like a display panel.

Second Embodiment

Figure 7:
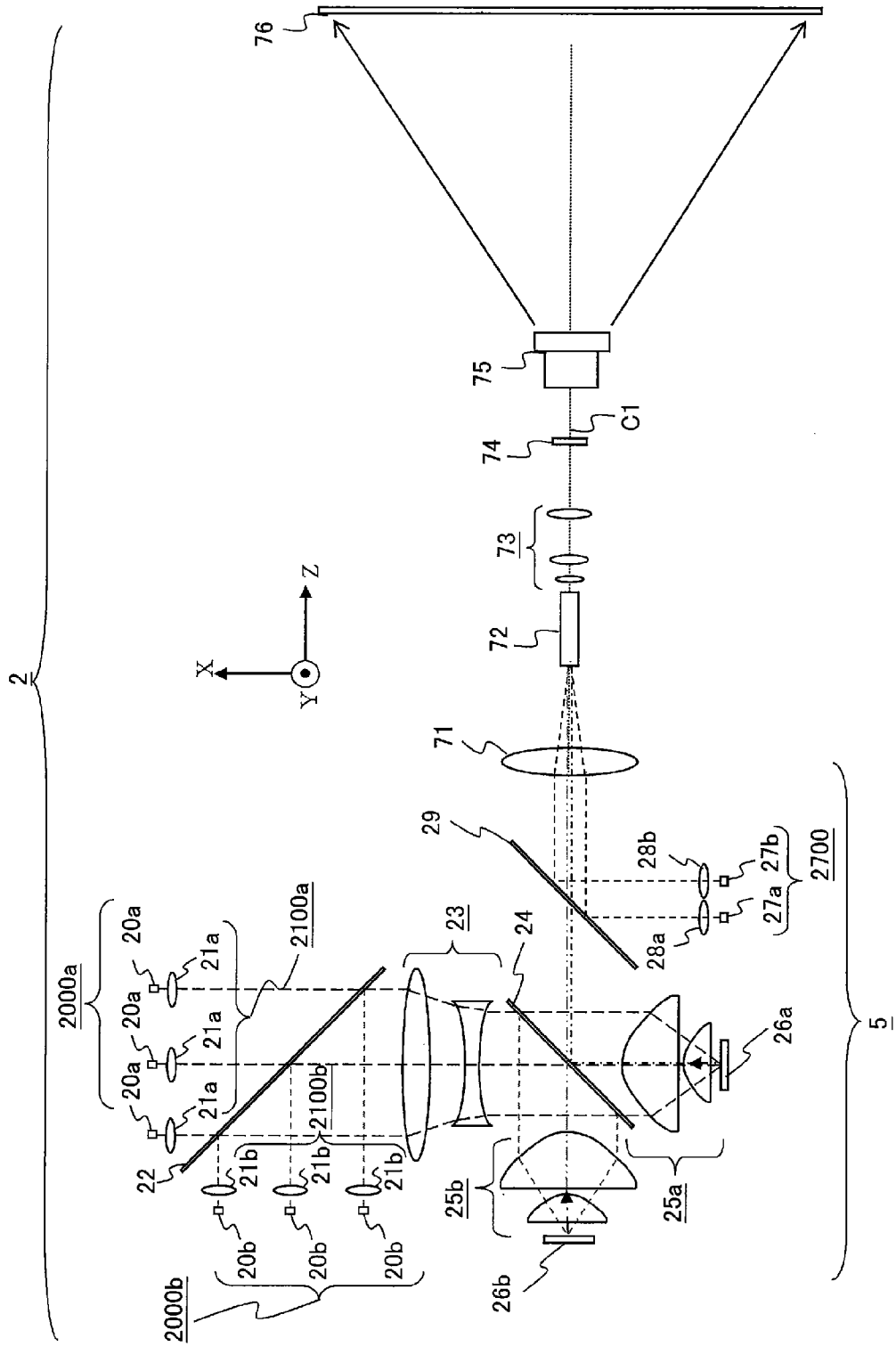
FIG. 7 is a diagram schematically illustrating a configuration of a light source device and a projection display device according to a second embodiment of the invention.

FIG. 7 is a diagram schematically illustrating a configuration of a projection display device 2 including a light source device 5 according to a second embodiment of the invention. To simplify the description, FIG. 7 shows an orthogonal XYZ coordinate system. The X-axis direction is the vertical direction in FIG. 7. The down-to-up direction in FIG. 7 is the positive X-axis direction; the up-to-down direction is the negative X-axis direction. A lens group 23, a polarization selection element 22, first collimating lenses 21a, second collimating lenses 21b, first monochromatic light sources 20a, and second monochromatic light sources 20b are disposed on the positive X-axis side of a polarization selection and wavelength selection element 24. The Y-axis direction is the direction perpendicular to the drawing sheet on which FIG. 7 is depicted. The positive Y-axis direction is the direction from the reverse side (back side) to the front side of the drawing sheet; the negative Y-axis direction is the direction from the front side to the reverse side (back side) of the drawing sheet. The Z-axis direction is the horizontal direction in FIG. 7. The left-to-right direction in FIG. 7 is the positive Z-axis direction; the right-to-left direction is the negative Z-axis direction. A color separation element 29, a focusing lens 71, a light intensity uniformization element 72, a relay lens group 73, an image display element 74, projection optics 75, and a screen 76 are disposed on the positive Z-axis side of the polarization selection and wavelength selection element 24.

The light source device 5 in the second embodiment differs from the light source device 4 in the first embodiment in that it uses the polarization selection element 22 in place of the light reflecting element 12. In FIG. 7, components that are the same as components shown in FIG. 1 (in the first embodiment) are given the same reference characters and descriptions are omitted. The components that are the same as components in the first embodiment are the focusing lens 71, the light intensity uniformization element 72, the relay lens group 73, the image forming element 74, the projection optics 75, and the screen 76. The components indicated below are denoted by reference characters differing from the reference characters used for the corresponding components in the first embodiment, but their configurations (including shapes, structures, material properties, etc.) and functions are the same as those of the corresponding components in the first embodiment. Therefore, wherever descriptions are omitted, the descriptions given in the first embodiment apply. The components in the second embodiment that are shown with reference characters differing from those used in the first embodiment but whose configurations and functions are the same as those of the components in the first embodiment are the first monochromatic light sources 20a, the second monochromatic light sources 20b, the first collimating lenses 21a, the second collimating lenses 21b, the first monochromatic light source group 2000a, the second monochromatic light source group 2000b, the lens group 23, the polarization selection and wavelength selection element 24, the first focusing lens group 25a, the second focusing lens group 25b, the first phosphor layer 26a, the second phosphor layer 26b, the third monochromatic light sources 27a, 27b, the third collimating lenses 28a, 28b, and the color separation element 29.

The projection display device 2 according to the second embodiment includes the light source device 5, the light intensity uniformization element 72, the image display element or the light valve 74, and the projection optics 75 as shown in FIG. 7. The projection display device 2 may also include the focusing lens 71, the relay lens group 73, and the screen 76. The light source device 5 according to the second embodiment includes the first monochromatic light source group 2000a, the second monochromatic light source group 2000b, the polarization selection and wavelength selection element 24, the first phosphor layer 26a, the second phosphor layer 26b, and the polarization selection element 22 as shown in FIG. 7. The light source device 5 according to the second embodiment may also include a first collimating lens group 2100a, a second collimating lens group 2100b, the lens group 23, the first focusing lens group 25a, and the second focusing lens group 25b. In addition, the light source device 5 in the second embodiment may include the third monochromatic light sources 27a, 27b, the third collimating lenses 28a, 28b, and the color separation element 29, as shown in FIG. 7.

The light source device 5 according to the second embodiment positions first monochromatic light source group 2000a that outputs the first polarized light and the first collimating lens group 2100a away from the second monochromatic light source group 2000b that outputs second polarized light and the second collimating lens group 2100b. The first polarized light output from the first monochromatic light source group 2000a strikes one surface of the polarization selection element 22 (the surface facing toward the upper right in FIG. 7) at an incidence angle of 45 degrees here. The second polarized light output from the second monochromatic light source group 2000b strikes the other surface of the polarization selection element 22 (the surface facing toward the lower left in FIG. 7) at an incidence angle of 45 degrees. The polarization selection element 22 is used to make the first polarized light and the second polarized light into a light flux directed toward the polarization selection and wavelength selection element 24. That is, in FIG. 7, the polarization selection element 22 transmits the first polarized light. The polarization selection element 22 also reflects the second polarized light. The polarization selection element 22 combines the first polarized light and the second polarized light into a single light flux. The light flux combined by the polarization selection element 22 is output from the polarization selection element 22 toward the lens group 23.

In all other regards, the light source device 5 according to the second embodiment is the same as the light source device 4 according to the first embodiment. The second embodiment provides enhanced flexibility in selecting the arrangement of the first monochromatic light sources 20a and the second monochromatic light sources 20b, resulting in easier design. In addition, since the array density of the light sources can be improved, they can output more light. That is, the polarization selection element 22 combines the first polarized light and the second polarized light, and in comparison with the first embodiment, can thereby create a more narrow light flux with the same quantity of light. The quantity of light per unit area in the light flux therefore increases in the second embodiment. Furthermore, in FIG. 7, the components other than the lens group 23 (e.g., the polarization selection and wavelength selection element 24, the color separation element 29, and the focusing lens 71) can be smaller in size.

Figure 8:
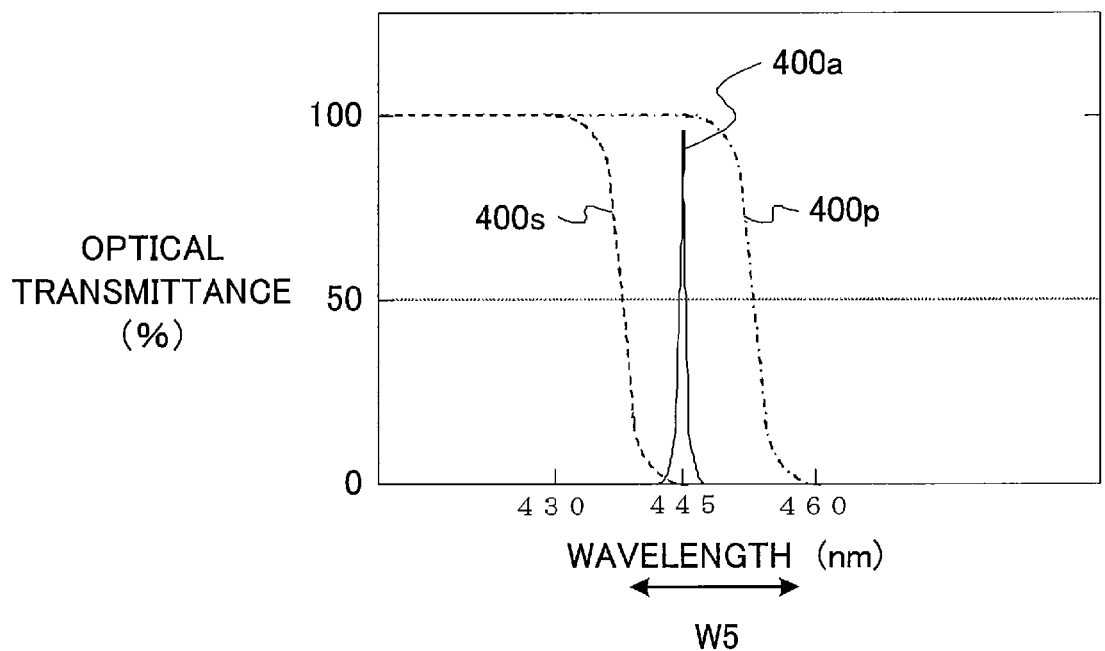
FIG. 8 is a diagram illustrating polarization separation characteristics of a polarization selection element in FIG. 7.

FIG. 8 is a schematic diagram showing optical transmission characteristics of the polarization selection element 22. In FIG. 8, the horizontal axis represents the wavelength [nm] of light and the vertical axis represents optical transmittance [%]. A curve 400p represents optical transmission characteristic for p-polarized light incident on the polarization selection element 22. The curve 400p is shown by a dot-dash line. A curve 400s represents optical transmission characteristic for s-polarized light incident on the polarization selection element 22. The curve 400s is shown by a dotted line.

As shown by the curves 400p and 400s, the polarization selection element 22 has different optical transmission characteristics for p-polarized light and s-polarized light. The characteristics of the polarization selection element 22 when the first monochromatic light sources 20a and the second monochromatic light sources 20b are blue laser emitting elements are as shown in FIG. 8. The curve 400p shows the optical transmittance decreasing from a wavelength of 445 nm (more precisely speaking, near 445 nm), and becoming 0% at a wavelength of 460 nm (more precisely speaking, near 460 nm). The curve 400s shows the optical transmittance decreasing from a wavelength of 430 nm (more precisely speaking, near 430 nm) and becoming 0% at a wavelength of 445 nm (more precisely speaking, near 445 nm).

This difference in optical transmission characteristics causes light in a wavelength band W5 indicated by a double-headed arrow in FIG. 8 to be transmitted if the light is p-polarized light but reflected if it is s-polarized light. That is, the polarization selection element 22 can be used as a polarization selection element for the light in the wavelength band W5 indicated by the double-headed arrow in FIG. 8. The polarization selection element 22 can also be used as a wavelength selection element (a color band filter) for light of wavelengths other than the wavelength band W5 indicated by the double-headed arrow in FIG. 8. In FIG. 8, the wavelength band W5 is a band from 440 nm to 450 nm. In the wavelength band W5 from 440 nm to 450 nm, for example, the optical transmittance of p-polarized light is 90% or more and the reflectance of s-polarized light is 90% or more. Characteristics at wavelengths less than 440 nm do not matter. For example, at 425 nm, the optical transmittance of p-polarized light may be 60% and the reflectance of s-polarized light may be 30%. What matters here is the optical transmittance and reflectance characteristics for polarized light in the range from 440 nm to 450 nm, in which the polarization selection function is used.

If the center wavelengths of the first monochromatic light sources 20a and the second monochromatic light sources 20b are 445 [nm], the polarization selection element 22 has the property of reflecting light with wavelengths longer than 460 [nm]. This example assumes that the center wavelengths of the first monochromatic light sources 20a and the second monochromatic light sources 20b are 445 [nm]. However, the center wavelengths may be 465 [nm]. In this case, it suffices for the curve 400p of the polarization selection element 22 to be transmissive below 470 nm and the curve 400s to be transmissive below 460 nm. The light with a wavelength of 465 [nm] only has to excite the first phosphor layer 26a to output red light. The light with a wavelength of 465 [nm] only has to excite the second phosphor layer 26b to output green light. The colors excited here by the first phosphor layer 26a and the second phosphor layer 26b are determined by the properties of the polarization selection element 22.

The polarization selection element 22 is formed with a multilayer dielectric film having the properties of a color separation filter. In the second embodiment, the polarization selection element 22 is a flat plate-shaped element. The case in which the first monochromatic light sources 20a output p-polarized light and the second monochromatic light sources 20b output s-polarized light is shown.

The characteristics of the polarization selection and wavelength selection element 24 are the same as the characteristics of the polarization selection and wavelength selection element 14 in the first embodiment. The polarization selection and wavelength selection element 24 has the optical transmission characteristics with respect to wavelength similar to those in FIG. 4 or 6. FIG. 4 shows a characteristic for the case in which the first phosphor layer 26a outputs light in a red wavelength band. It also shows a characteristic for the case in which the second phosphor layer 26b outputs light in a green wavelength band. FIG. 6 shows a characteristic for the case in which the first phosphor layer 26a outputs light in a green wavelength band. It also shows a characteristic for the case in which the second phosphor layer 26b outputs light in a red wavelength band.

When the first monochromatic light sources 20a output the first polarized light and the second monochromatic light sources 20b output the second polarized light, in general, the polarized components of the first polarized light output from the first monochromatic light sources 20a and the second polarized light output from the second monochromatic light sources 20b are not 100% polarized. For this reason, the first polarized light includes polarized light with slightly different polarization components. The second polarized light also includes polarized light with slightly different polarization components. The second embodiment enables the polarization selection and wavelength selection element 24 to reject the light of s-polarized components incident from the first monochromatic light sources 20a. The polarization selection and wavelength selection element 24 can also reject the light of p-polarized components incident from the second monochromatic light sources 20b. Similarly, the polarization selection element 22 can reject the light of s-polarized components incident from the first monochromatic light sources 20a. The polarization selection element 22 can reject the light of p-polarized components incident from the second monochromatic light sources 20b.

Thus, when only the first monochromatic light sources 20a are lit, for example, light of s-polarized components in the light output from the first monochromatic light sources 20a is reflected by the polarization selection element 22. This eliminates light of s-polarized components directed toward the second phosphor layer 26b from the light output from the first monochromatic light sources 20a. Consequently the second phosphor layer 26b (green phosphor) does not radiate light, which can prevent mixing of the colors red and green.

The second embodiment also enables more space to be provided between the first monochromatic light sources 20a and the second monochromatic light sources 20b than in the first embodiment. The light sources in light source devices are heat generating elements. By providing more space between the first monochromatic light sources 20a and the second monochromatic light sources 20b, the concentration of these heat generating elements is reduced, which enables the heat to dissipate more easily. This improves the light output efficiency of the first monochromatic light sources 20a and second monochromatic light sources 20b. The cooling structure for the light sources can also be simplified. In addition, the light source device can be smaller.

When the polarization selection element 22 and the polarization selection and wavelength selection element 24 are given equivalent optical transmission characteristics (the characteristics in FIG. 4 or 6), it is also possible to prevent color mixing caused by less than 100% polarization of the polarized components of the first polarized light and the polarized components of the second polarized light. The first polarized light is light output from the first monochromatic light sources 20a. The second polarized light is light output from the second monochromatic light sources 20b. Accordingly, by giving the polarization selection element 22 and the polarization selection and wavelength selection element 24 equivalent optical transmission characteristics, color mixing can be prevented. In addition, the polarization selection element 22 and the polarization selection and wavelength selection element 24 can be processed in the same lot. Therefore, since the manufacture of the polarization selection element 22 and the polarization selection and wavelength selection element 24 is simplified, the cost can be reduced. In addition, since the polarization selection element 22 and the polarization selection and wavelength selection element 24 belong to the same lot, variations in their optical transmission characteristics can be suppressed, and quality can be improved by preventing color mixing. Here, the second embodiment also produces the effect of preventing color mixing caused by variations of ±5 nm or more from 445 nm in the center wavelengths of the first monochromatic light sources 20a and the second monochromatic light sources 20b.

The polarization selection element 22 transmits one of the first polarized light and the second polarized light and reflects the other, thereby aiming the direction of propagation of the first polarized light and the direction of propagation of the second polarized light toward the polarization selection and wavelength selection element 24.

The optical transmission characteristics indicating variations in the optical transmittance with respect to wavelength of the polarization selection and wavelength selection element 24 and the optical transmission characteristics indicating variations in the optical transmittance with respect to wavelength of the polarization selection element 22 are the same. Provided it has a polarization selection characteristic, however, the polarization selection element 22 can be effective in preventing color mixing even if it does not have the same characteristics as the polarization selection and wavelength selection element 24.

Third Embodiment

Figure 9:
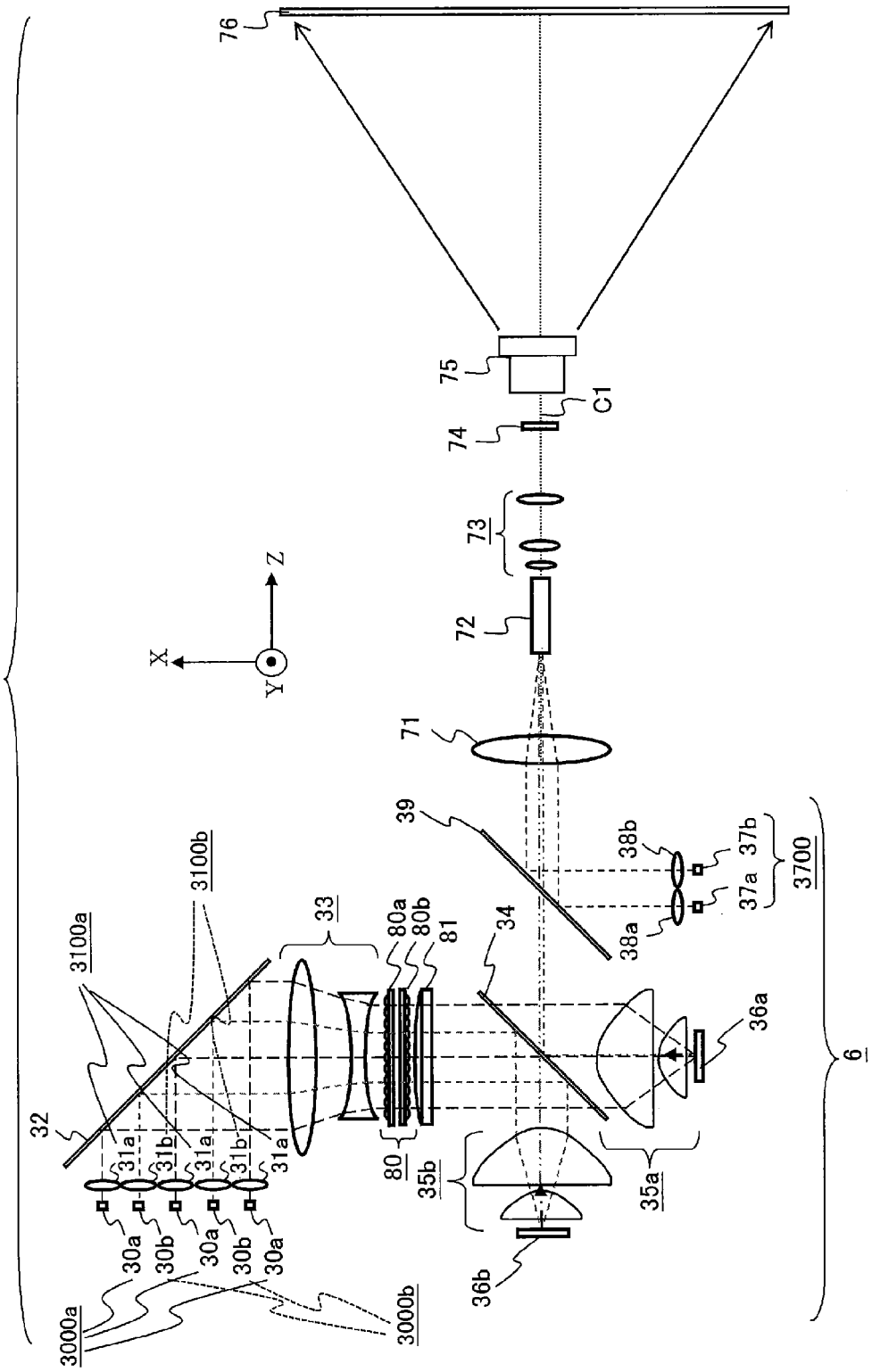
FIG. 9 is a diagram schematically illustrating a configuration of a light source device and a projection display device according to a third embodiment of the invention.

FIG. 9 is a diagram schematically illustrating a configuration of a projection display device 3 including a light source device 6 according to a third embodiment. To simplify the description, FIG. 9 shows an orthogonal XYZ coordinate system. The X-axis direction is the vertical direction in FIG. 9. The down-to-up direction in FIG. 9 is the positive X-axis direction; the up-to-down direction is the negative X-axis direction. A lens group 33, a light reflecting element 32, first collimating lenses 31a, second collimating lenses 31b, first monochromatic light sources 30a, and second monochromatic light sources 30b are disposed on the positive X-axis side of a polarization selection and wavelength selection element 34. The Y-axis direction is the direction perpendicular to the drawing sheet on which FIG. 9 is depicted. The positive Y-axis direction is the direction from the reverse side (back side) to the front side of the drawing sheet; the negative Y-axis direction is the direction from the front side to the reverse side (back side) of the drawing sheet. The Z-axis direction is the horizontal direction in FIG. 9. The left-to-right direction in FIG. 9 is the positive Z-axis direction; the right-to-left direction is the negative Z-axis direction. A color separation element 39, a focusing lens 71, a light intensity uniformization element 72, a relay lens group 73, an image display element 74, projection optics 75, and a screen 76 are disposed on the positive Z-axis side of the polarization selection and wavelength selection element 34.

The light source device 6 in the third embodiment differs from the light source device 4 in the first embodiment in that it further includes a lens array group 80 and a lens 81. In FIG. 9, components that are the same as components shown in FIG. 1 (in the first embodiment) are given the same reference characters and descriptions are omitted. The components that are the same as components in the first embodiment are the focusing lens 71, the light intensity uniformization element 72, the relay lens group 73, image display element 74, the projection optics 75, and the screen 76. The components indicated below are denoted by reference characters differing from the reference characters used for the corresponding components in the first embodiment, but their configurations (including shapes, structures, material qualities, etc.) and functions are the same as those of the corresponding components in the first embodiment. Therefore, wherever descriptions are omitted, the descriptions given in the first embodiment apply. The components in the third embodiment that are shown with reference characters differing from those used in the first embodiment but whose configurations and functions are the same as those of the components in the first embodiment are the first monochromatic light sources 30a, the second monochromatic light sources 30b, the first collimating lenses 31a, the second collimating lenses 31b, the first monochromatic light source group 3000a, the second monochromatic light source group 3000b, the lens group 33, the polarization selection and wavelength selection element 34, a first focusing lens group 35a, a second focusing lens group 35b, a first phosphor layer 36a, a second phosphor layer 36b, third monochromatic light sources 37a, 37b, third collimating lenses 38a, 38b, and the color separation element 39.

The projection display device 3 according to the third embodiment includes the light source device 6, the light intensity uniformization element 72, the image display element or the light valve 74, and the projection optics 75 as shown in FIG. 9. The projection display device 3 may also include the focusing lens 71, the relay lens group 73, and the screen 76. The light source device 6 according to the third embodiment includes the first monochromatic light source group 3000a, the second monochromatic light source group 3000b, the polarization selection and wavelength selection element 34, the first phosphor layer 36a, the second phosphor layer 36b, and the lens array group 80 as shown in FIG. 9. The light source device 6 in the third embodiment may also include a first collimating lens group 3100a, a second collimating lens group 3100b, the light reflecting element 32, the first focusing lens group 35a, the second focusing lens group 35b, and the lens 81. In addition, the light source device 6 in the third embodiment may include the third monochromatic light sources 37a, 37b, the third collimating lenses 38a, 38b, and the color separation element 39, as shown in FIG. 9.

Except for including the lens array group 80 and the lens 81, the light source device 6 according to the third embodiment is the same as the light source device 4 in the first embodiment. Light fluxes output from the first monochromatic light sources 30a and the second monochromatic light sources 30b are reflected by the light reflecting element 32 and their diameters are reduced by the lens group 33. The light fluxes output from the first monochromatic light sources 30a are focused through the lens array group 80, the lens 81, and the first focusing lens group 35a into a specific shape on the first phosphor layer 36a. Similarly, the light fluxes output from the second monochromatic light sources 30b are focused through the lens array group 80, the lens 81, and the second focusing lens group 35b into a specific shape on the second phosphor layer 36b.

Figure 10A:
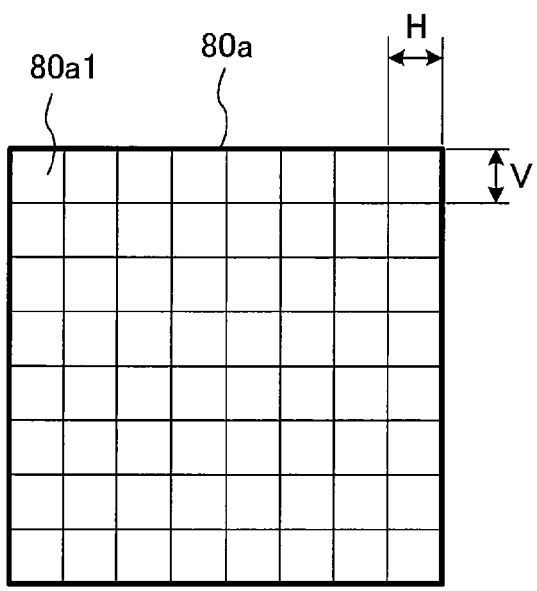
FIGS. 10(*a*) and 10(*b*) are schematic frontal views illustrating a lens array in FIG. 9.
Figure 10B:
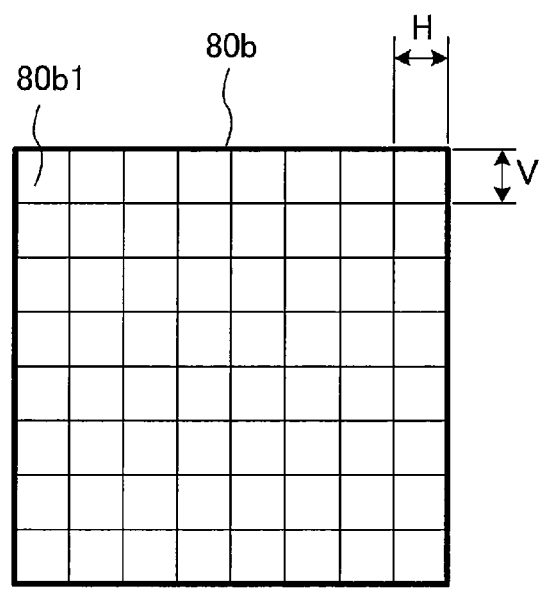

FIGS. 10(a) and 10(b) are schematic frontal views illustrating a first lens array 80a and a second lens array 80b. FIG. 10(a) shows the first lens array 80a. FIG. 10(b) shows the second lens array 80b. As shown in FIGS. 10(a) and 10(b), the lens array group 80 includes the first lens array 80a and the second lens array 80b. The first lens array 80a includes a plurality of lens cells 80a1 arrayed in the horizontal and vertical directions. Similarly, the second lens array 80b includes a plurality of lens cells 80b1 arrayed in the horizontal and vertical directions. The 'horizontal and vertical directions' here denote the directions of mutually orthogonal axes on a plane.

The shapes of the lens cells 80a1 and 80b1 are not particularly limited. The shapes of the lens cells 80a1 and 80b1 are, however, preferably similar to the shape of the incidence surface 72a of the light intensity uniformization element 72. The shape of the lens cells 80a1 in the first lens array 80a is focused onto the first phosphor layer 36a and second phosphor layer 36b. That is, the incidence surface of the first lens array 80a is in an optically conjugate relation with the first phosphor layer 36a. The incidence surface of the first lens array 80a is also in an optically conjugate relation with the second phosphor layer 36b. An 'optically conjugate relation' is a relationship in which light emitted from one point forms an image at the other point.

Here, the lens cells 80a1 and 80b1 in FIGS. 10(a) and 10(b) are square in shape. However, since the exit surface 72b of the light intensity uniformization element 72 is in an optically conjugate relation with the light valve 74, the shapes of the lens cells 80a1 and 80b1 are preferably generally similar to the shape of the light valve 74. For example, for the light valve 74 with an XGA (eXtended Graphics Array: 1024×768 pixels) resolution, the shapes of the lens cells 80a1 and 80b1 preferably have a 4:3 ratio of the horizontal dimension to the vertical dimension (H:V=4:3). The incidence surface 72a of the light intensity uniformization element 72 is preferably shaped such that the ratio of its horizontal dimension 72aH to its vertical dimension 72aV is 4:3 (horizontal: vertical)(72aH:72aV=4:3).

Since the first phosphor layer 36a and the incidence surface 72a of the light intensity uniformization element 72 are in an optically conjugate relation and the second phosphor layer 36b and the incidence surface 72a of the light intensity uniformization element 72 are in an optically conjugate relation, the shape of the incidence surface of the first lens array 80a is preferably similar to the shape of the incidence surface 72a of the light intensity uniformization element 72.

The lens array group 80 has the effect of reducing the density of the light fluxes focused onto the first phosphor layer 36a and the second phosphor layer 36b. When a light flux of high optical density is incident, the efficiency (external quantum efficiency) of the excitation light on the first phosphor layer 36a and the second phosphor layer 36b is degraded by the influence of local increases in temperature. Therefore, it is preferable to focus the light as evenly as possible to uniformize the temperature distribution, thereby improving the external quantum efficiency. When polarized light is used as excitation light as in the first to third embodiments, however, it is not preferable to choose a means such as a light diffusion plate disposed following the lens array group 80 to reduce the focused density on the first phosphor layer 36a and the second phosphor layer 36b. This is because a light diffusion plate disturbs the polarization direction of the light. The term 'following' denotes the side toward which the light propagates (i.e., the downstream side in the direction of light propagation) from a position through which the light is transmitted. The term 'preceding' denotes the side away from which the light propagates (i.e., the upstream side in the direction of light propagation) from a position through which the light is transmitted. For example, in FIG. 9, the light intensity uniformization element 72, the relay lens group 73, the light valve 74, the projection optics 75, and the screen 76 are disposed following the focusing lens 71. The light valve 74, the relay lens group 73, the light intensity uniformization element 72, and the focusing lens 71 are disposed preceding the projection optics 75. The use of the lens array group 80 can solve the above problem of the incidence of a light flux of high optical density on the phosphor surfaces. Furthermore, the shape of the incidence surface of the first lens array 80a can be selected to enhance the focusing efficiency of the light focused onto the light intensity uniformization element 72.

The lens 81 is preferably disposed following the lens array group 80. The lens 81 suppresses the dispersion of light that has passed through the lens array group 80, thereby suppressing a reduction in the amount of light reaching the first focusing lens group 35a or the second focusing lens group 35b. This enables light to be focused efficiently onto the first phosphor layer 36a and the second phosphor layer 36b.

The light flux preceding the lens array group 80 is preferably collimated as well as possible. This can efficiently guide the light flux output from the lens array group 80 to the first phosphor layer 36a and the second phosphor layer 36b.

The lens cells 80a1 of the first lens array 80a and the lens cells 80b1 of the second lens array 80b may be mutually eccentric. Making the lens cells 80a1, 80b1 eccentric enhances the light focusing efficiency and the uniformity of the light intensity on the first phosphor layer 36a and the second phosphor layer 36b.

Although the lens 81 is provided in the third embodiment, even if the lens 81 is omitted, it is still possible to focus the light flux into a desired shape on the first phosphor layer 36a and the second phosphor layer 36b.

In the third embodiment, the first polarized light output from the first monochromatic light sources 30a reaches the first phosphor layer 36a. The second polarized light output from the second monochromatic light sources 30b reaches the second phosphor layer 36b. The light output from the third monochromatic light sources 37a and 37b is combined with the light excited in the first phosphor layer 36a and the second phosphor layer 36b, and reaches the light intensity uniformization element 72. Accordingly, the amount of red light, the amount of green light, and the amount of blue light can be controlled at the corresponding light sources. Therefore, the light source device and the light sources in the third embodiment can be controlled so as not to emit more light than necessary, thereby lengthening the service life of the light source. It also becomes possible to respond to various color balances in the image to be displayed. That is, in order to display a strongly red image, the individual light sources 30a, 30b, 37a and 37b can be controlled to increase the optical intensity of red light and reduce the output of green light and blue light.

The invention in the third embodiment can be used as a light source not only for rear projection television sets, and for frontal projectors and front projection display devices that project images onto a wall or a screen, but also for in-vehicle display devices and other applications. The inventions according to the first, second, fourth, and fifth embodiments can also be used as light sources not only for rear projection television sets, and for frontal projectors and front projection display devices that project images onto a wall or a screen, but also for in-vehicle display devices and other applications.

Another wavelength selection element having an optical transmission band including both the wavelength band of the first polarized light output from the first monochromatic light source group 3000a and the wavelength band of the second polarized light output from the second monochromatic light source group 3000b may also be provided. This wavelength selection element is disposed on the light path from the first monochromatic light source group 3000a and the second monochromatic light source group 3000b to the polarization selection and wavelength selection element 34.

The light source device 6 includes the first lens array 80a including the array of the lens cells 80a1 and the second lens array 80b including the array of the lens cells 80b1, and has the lens array group 80 with the first lens array 80a and the second lens array 80b arranged facing each other. The first lens array 80a is disposed on the common light path shared by the light path of the first polarized light from the first monochromatic light source group 3000a to the polarization selection and wavelength selection element 34 and the light path of the second polarized light from the second monochromatic light source group 3000b to the polarization selection and wavelength selection element 34, and the incidence surface of the first lens array 80a is in an optically conjugate relation with the first phosphor layer 36a and the second phosphor layer 36b.

Fourth Embodiment

Figure 11:
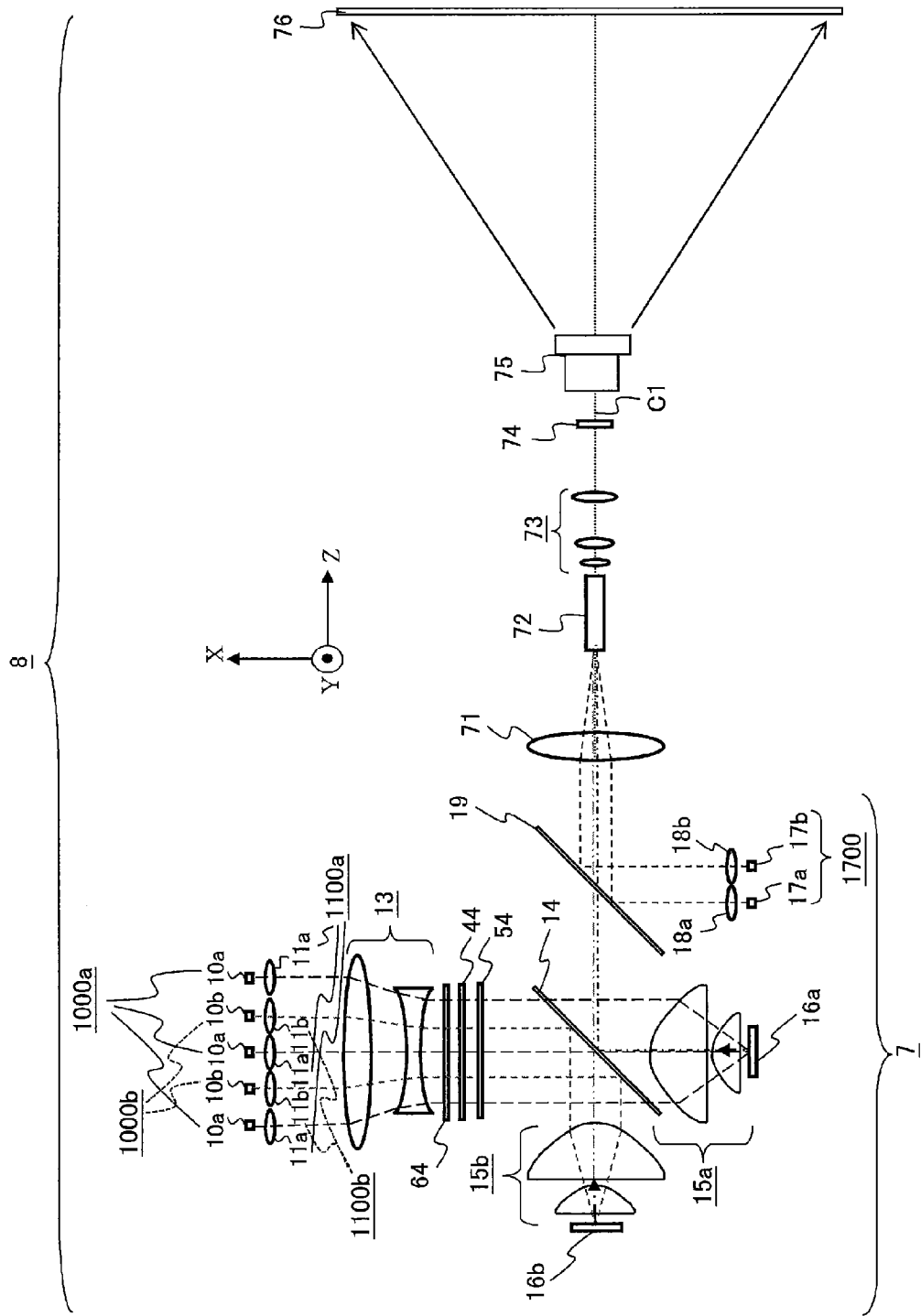
FIG. 11 is a diagram schematically illustrating a configuration of a light source device and a projection display device according to a fourth embodiment of the invention.

FIG. 11 is a diagram schematically illustrating a configuration of a projection display device 8 including a light source device 7 according to a fourth embodiment of the invention. To simplify the description, FIG. 11 shows an orthogonal XYZ coordinate system. The X-axis direction is the vertical direction in FIG. 11. The down-to-up direction in FIG. 1 is the positive X-axis direction; the up-to-down direction is the negative X-axis direction. Wavelength selection elements 44 and 54, a lens group 13, first collimating lenses 11a, second collimating lenses 11b, first monochromatic light sources 10a, and second monochromatic light sources 10b are disposed on the positive X-axis side of a polarization selection and wavelength selection element 14. The Y-axis direction is the direction perpendicular to the drawing sheet on which FIG. 7 is depicted. The positive Y-axis direction is the direction from the reverse side (back side) to the front side of the drawing sheet; the negative Y-axis direction is the direction from the front side to the reverse side (back side) of the drawing sheet. The Z-axis direction is the horizontal direction in FIG. 11. The left-to-right direction in FIG. 11 is the positive Z-axis direction; the right-to-left direction is the negative Z-axis direction. A color separation element 19, a focusing lens 71, a light intensity uniformization element 72, a relay lens group 73, an image display element 74, projection optics 75, and a screen 76 are disposed on the positive Z-axis side of the polarization selection and wavelength selection element 14.

The light source device 7 in the fourth embodiment differs from the light source device 4 in the first embodiment in that it includes the wavelength selection elements 44 and 54. The light source device 7 in the fourth embodiment further differs from the light source device 4 in the first embodiment in that it does not include a light reflecting element 12. In FIG. 11, components that are the same as components shown in FIG. 1 (in the first embodiment) are given the same reference characters and descriptions are omitted. The components in FIG. 11 that are the same as components shown in FIG. 1 (in the first embodiment) are the first monochromatic light sources 10a, the second monochromatic light sources 10b, the first collimating lenses 11a, the second collimating lenses 11b, a first monochromatic light source group 1000a, a second monochromatic light source group 1000b, the lens group 13, the polarization selection and wavelength selection element 14, a first focusing lens group 15a, a second focusing lens group 15b, a first phosphor layer 16a, a second phosphor layer 16b, third monochromatic light sources 17a, 17b, third collimating lenses 18a, 18b, a color separation element 19, the focusing lens 71, the light intensity uniformization element 72, the relay lens group 73, the image forming element 74, the projection optics 75, and the screen 76.

If a center wavelength of the first monochromatic light source group 1000a and a center wavelength of the second monochromatic light source group 1000b deviate from their design value (in the range from 440 nm to 450 nm), a portion of first polarized light output from the first monochromatic light source group 1000a is reflected by the polarization selection and wavelength selection element 14 and reaches the second phosphor layer 16b. Similarly, a portion of second polarized light output from the second monochromatic light source group 1000b is transmitted through the polarization selection and wavelength selection element 14 and reaches the first phosphor layer 16a. As a result, color mixing occurs. The fourth embodiment will be described on the assumption that the design value of the center wavelength of the first monochromatic light source group 1000a and the center wavelength of the second monochromatic light source group 1000b is 445 nm. By placing the wavelength selection elements 44 and 54 that transmit light with wavelengths near 445 nm (in the range from 440 nm to 450 nm) only between the light sources 10a, 10b and the polarization selection and wavelength selection element 14, the aforementioned color mixing can be suppressed.

Whereas color mixing due to deviation in the polarization direction of light was dealt with in the second embodiment, color mixing due to deviation in the wavelength of light will be dealt with in the fourth embodiment. The fourth embodiment can prevent color mixing due to deviation of the wavelength of light. By eliminating the light reflecting element 12, the fourth embodiment also makes a distance from the first monochromatic light sources 10a and the second monochromatic light sources 10b to the lens group 13 shorter than in the first embodiment. This shortens the dimension of the light source device 4 in the X-axis direction, so the light source device 4 can be made more compact.

The wavelength selection elements 44 and 54 in FIG. 11 are disposed between the lens group 13 and the polarization selection and wavelength selection element 14. The wavelength selection element 44 is disposed on the side nearer the lens group 13 (in the positive X-axis direction); the wavelength selection element 54 is disposed on the side nearer the polarization selection and wavelength selection element 14 (in the negative X-axis direction). A light diffusion element 64 is disposed between the lens group 13 and the wavelength selection element 44.

The fourth embodiment will be described for the case in which the polarization selection and wavelength selection element 14 has the optical transmission characteristics shown in FIG. 4. When the center wavelength of the second monochromatic light source group 1000b is 450 nm or more, a portion of s-polarized light in the second polarized light is transmitted through the polarization selection and wavelength selection element 14 and reaches the first phosphor layer 16a. When the center wavelength of the first monochromatic light source group 1000a is 440 nm or less, a portion of p-polarized light in the first polarized light is reflected by the polarization selection and wavelength selection element 14 and reaches the second phosphor layer 16b. This means that if the center wavelengths of the first monochromatic light source group 1000a and the second monochromatic light source group 1000b deviate from the vicinity of 445 nm (within the range from 440 nm to 450 nm) to a short wave side or long wave side, color mixing occurs. Therefore, it is preferable to place the wavelength selection elements 44, 54 that transmit only light of wavelengths near 445 nm between the light sources 10a, 10b and the polarization selection and wavelength selection element 14.

Figure 12:
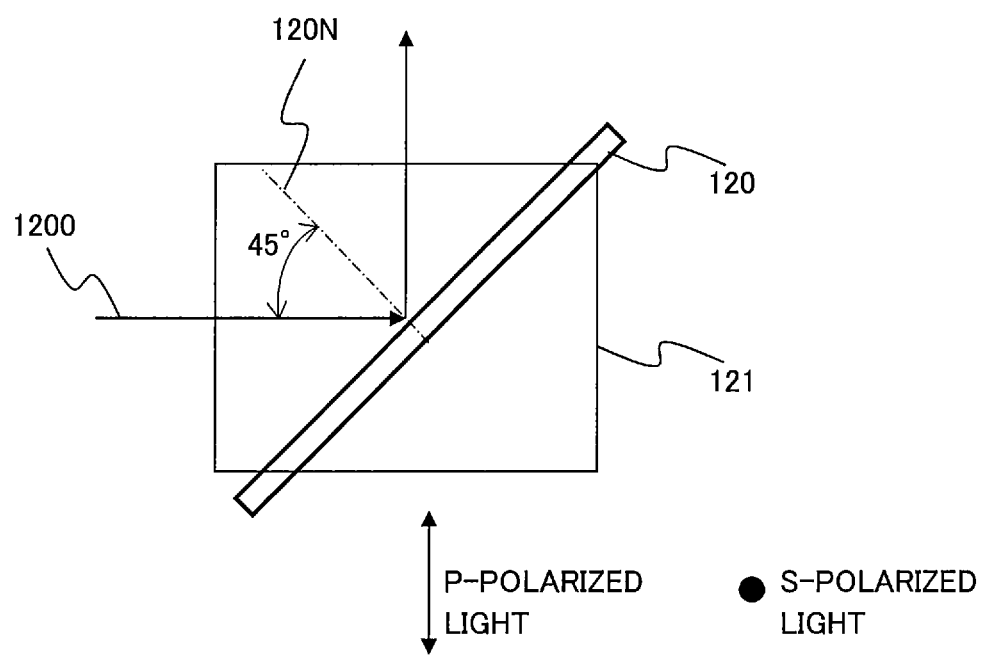
FIG. 12 is a diagram that explains a reference standard of an axis of polarization (polarization direction).

The wavelength selection elements 44 and 54 will now be described. The polarization selection and wavelength selection element 14 has different optical transmission characteristics for p-polarized light and s-polarized light. When light enters the polarization selection and wavelength selection element 14 at an incident angle of 45 degrees, the optical transmission characteristics of p-polarized light and the optical transmission characteristics of s-polarized light therefore show different features. When light enters the polarization selection and wavelength selection element 14 at an incident angle of 0 degrees, however, p-polarized light and s-polarized light show the same optical transmission characteristics. That is, the polarization selection and wavelength selection element 14 has the property of losing its polarization selection function when light enters the polarization selection and wavelength selection element 14 at an incident angle of 0 degrees. FIG. 12 is a diagram illustrating p-polarized light and s-polarized light.

FIG. 12 is a diagram illustrating a reference plane of a polarization axis (polarization direction). The reference plane 121 is a plane that includes an optical axis (indicated by a right-pointing arrow in FIG. 12) of a light ray 1200 incident on a reflecting element 120 and an optical axis (indicating by an upward-pointing arrow in FIG. 12) of the light ray 1200 reflected by the reflecting element 120. Light with a polarization axis parallel to the reference plane 121 is p-polarized light; light with a polarization axis orthogonal to the reference plane 121 is s-polarized light. Accordingly, when the light ray 1200 is incident parallel to a normal 120N of the reflecting surface of the reflecting element 120 (i.e., when the incidence angle is 0 degrees), no reference plane is defined. This is because the optical axis of the light incident on the reflecting element 120 and the optical axis of the light reflected by the reflecting element 120 coincide, so the plane (reference plane) that includes the optical axis of the light incident on the reflecting element 120 and the optical axis of the light reflected by the reflecting element 120 cannot be determined. Accordingly, when no reference plane can be determined, the wavelength selection elements 44 and 54 show the same optical transmission characteristics for both p-polarized light and s-polarized light, as mentioned above. In other words, as the incidence angle of the light becomes smaller than 45 degrees, the p-s polarization separation width (e.g., the width of the wavelength band W1 and the width of the wavelength band W2 in FIG. 4) narrows. As the incidence angle of the light becomes greater than 45 degrees, the p-s separation width (e.g., the width of the wavelength band W1 and the width of the wavelength band W2 in FIG. 4) widens. Care is required, since the optical transmission characteristics of a multilayer dielectric film vary according to the incidence angle of the incident light. For example, as the incidence angle of the incident light decreases, the optical transmittance curves 200p and 200s indicating the optical transmission characteristics in FIG. 4 shift toward the long wavelength side (toward the right in FIG. 4).

Figure 13A:
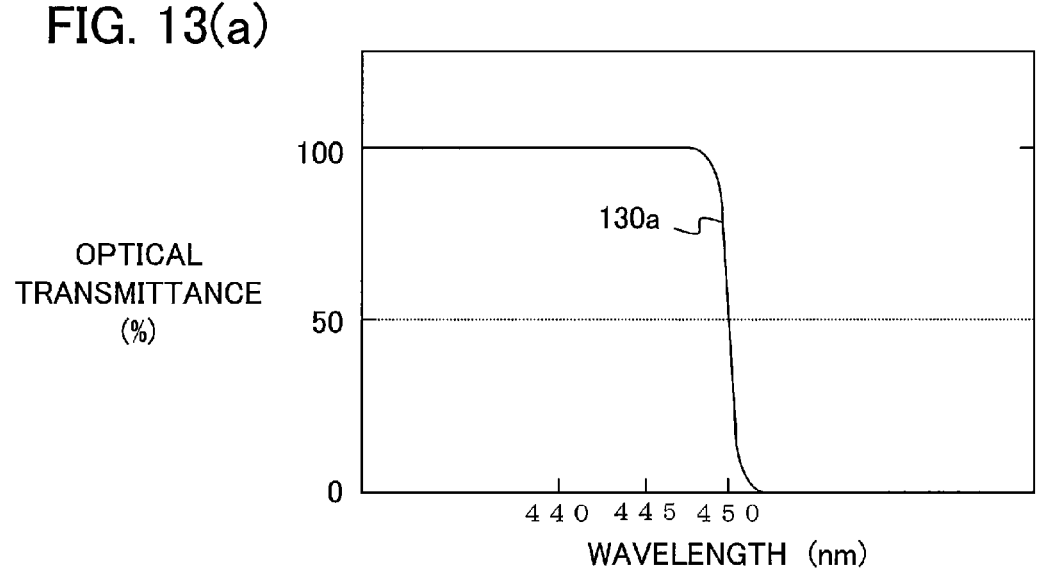
FIGS. 13(a) and 13(b) are diagrams illustrating wavelength separation characteristics of two wavelength selection elements shown in FIG. 11.
Figure 13B:
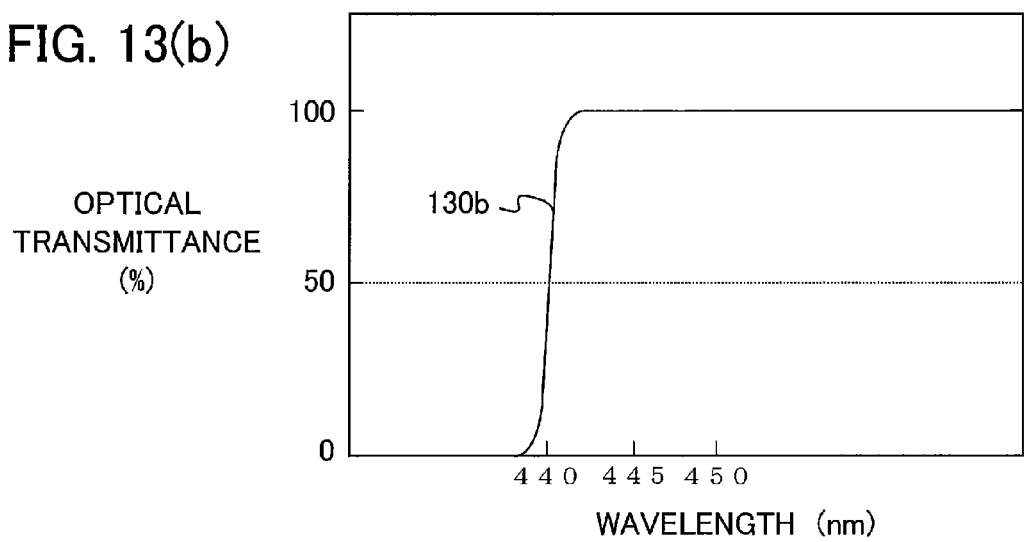

FIGS. 13(a) and 13(b) are schematic diagrams showing wavelength separation characteristics (optical transmission characteristics) of the wavelength selection elements 44 and 54. In FIGS. 13(a) and 13(b), the vertical axis represents optical transmittance [%] and the horizontal axis represents wavelength [nm] of light. FIG. 13(a) shows the optical transmission characteristic of the wavelength selection element 44; FIG. 13(b) shows the optical transmission characteristic of the wavelength selection element 54. The wavelength selection element 44 reflects light with wavelengths of 450 nm or more. That is, the wavelength selection element 44 reflects light on the long wavelength side of 450 nm. In order to reduce color mixing as much as possible, a transmittance curve 130a indicating the optical transmission characteristic of the wavelength selection element 44 may be shifted toward the short wavelength side of 450 nm. The wavelength selection element 54 reflects light having wavelengths of 440 nm or less. That is, wavelength selection element 54 reflects light on the short wavelength side of 440 nm. In order to reduce color mixing as much as possible, a transmittance curve 130b indicating the optical transmission characteristic of the wavelength selection element 54 may be shifted toward the long wavelength side of 440 nm.

Figure 14:
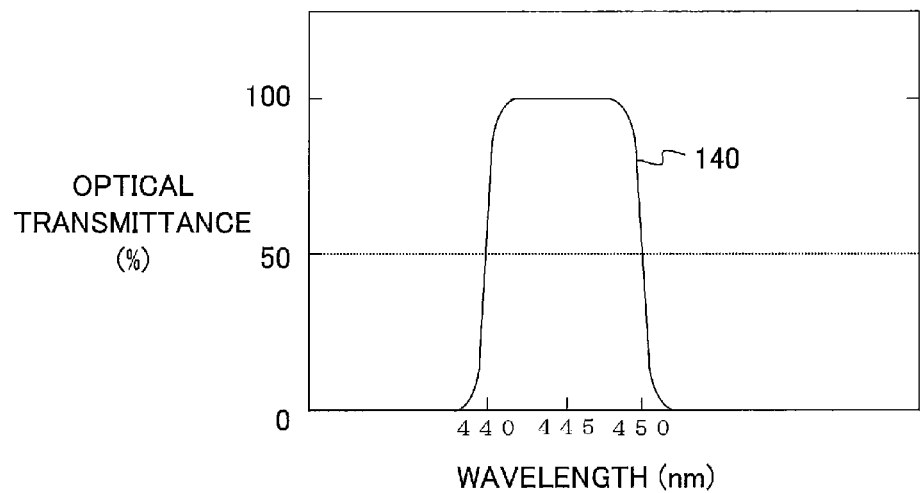
FIG. 14 is a diagram illustrating wavelength separation characteristic when the two wavelength separation elements shown in FIG. 11 are implemented with a single wavelength selection element.

The light passing through the wavelength selection element 44 and the wavelength selection element 54 is light with center wavelengths ranging from 440 nm to 450 nm. Thus, light outside this wavelength range is reflected and does not reach the polarization selection and wavelength selection element 14. FIG. 14 is a schematic diagram showing the wavelength separation characteristic when a single element is employed as the wavelength selection elements 44 and 54. In FIG. 14, the vertical axis represents optical transmittance [%] and the horizontal axis represents wavelength [nm] of light. With the characteristic shown in FIG. 14, light with wavelengths of 440 nm or less and light with wavelengths of 450 nm or more are reflected. That is, the optical transmission characteristic shown in FIG. 14 is a characteristic that transmits light in the wavelength range from 440 nm to 450 nm.

It suffices for the wavelength selection elements 44, 54 to provide the characteristic shown in FIG. 14. That is, the wavelength selection elements 44, 54 have the property of transmitting light with wavelengths in the range from 440 nm to 450 nm. For this reason, the wavelength selection elements can be combined into a single element if it provides an incidence surface having the optical transmission characteristic of the wavelength selection element 44 and an output surface having the characteristic of the wavelength selection element 54. The single wavelength selection element configuration allows the light source device 7 to be more compact.

It suffices for the wavelength of the light that passes through the wavelength selection element 44 and the wavelength selection element 54 to be within the range from 440 nm to 450 nm. Accordingly, the wavelength characteristics of the wavelength selection elements 44, 54 for wavelengths deviating greatly from 440 nm and 450 nm are immaterial. For example, in FIG. 13(a), the wavelength selection element 44 is shown as having the property of reflecting light on the long wavelength side of 450 nm (optical transmittance is 0%) and the property of transmitting light on the short wavelength side of 450 nm (optical transmittance is 100%). However, the wavelength selection element 44 however may have the property of reflecting light with a wavelength of 400 nm, which deviates greatly from 440 nm and 450 nm.

If light reflected by the wavelength selection elements 44, 54 were to return directly to the first monochromatic light source group 1000a and the second monochromatic light source group 1000b, it would shorten the life of the light sources constituting the first monochromatic light source group 1000a and the second monochromatic light source group 1000b. In order to prevent this, the light diffusion element 64 may be provided between the first monochromatic light source group 1000a and the wavelength selection elements 44, 54. The light diffusion element 64 may also be provided between the second monochromatic light source group 1000b and the wavelength selection elements 44, 54.

The light diffusion element 64 has the function of varying an angle of light. This enables a reduction of the intensity of light returning directly to the first monochromatic light source group 1000a and the second monochromatic light source group 1000b. The light diffusion element 64 may be disposed at any position as long as it is between the first monochromatic light source group 1000a and the second monochromatic light source group 1000b and the wavelength selection elements 44, 54. For example, the light diffusion element 64 may be disposed in the lens group 13. If the light diffusion element 64 has low light diffusivity, it has little effect on the degree of polarization of the light.

In the fourth embodiment, color mixing due to variations in the degree of polarization of the monochromatic light source groups 1000a, 1000b is not taken into consideration. In order to further reduce color mixing, however, the configuration in the second embodiment is preferable. The fourth embodiment can be considered preferable, however, from the viewpoints of reducing the size and manufacturing cost of the light source device.

A portion of the red light output from the first phosphor layer 16a is transmitted through the polarization selection and wavelength selection element 14. A portion of the green light output from the second phosphor layer 16b is reflected by the polarization selection and wavelength selection element 14. A portion of the light output from the first phosphor layer 16a and the second phosphor layer 16b is thereby returned to the monochromatic light source groups 1000a, 1000b.

Figure 15:
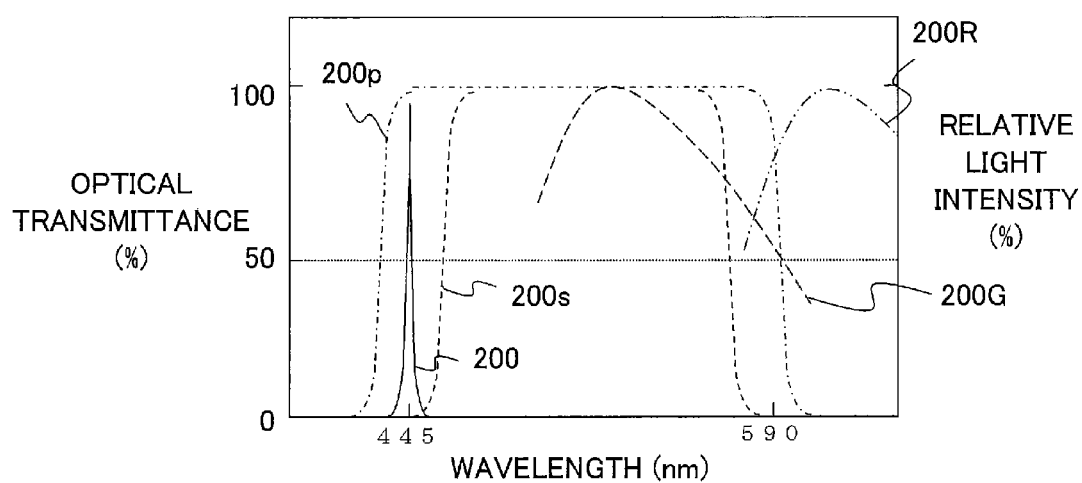
FIG. 15 is a diagram showing an exemplary relative light intensity curve (relative light intensity at each wavelength) of light emitted by excitation of a phosphor layer for color green and a phosphor layer for color red.

FIG. 15 is a schematic diagram showing an example of relative light intensity with respect to wavelength (a curve 200G) of the light excited in the phosphor layer for the color green. FIG. 15 is also a diagram showing an example of relative light intensity with respect to wavelength (a curve 200R) of the light excited in the phosphor layer for the color red. The vertical axis on the right side of FIG. 15 represents relative light intensity [%]. The vertical axis on the left side of FIG. 15 represents optical transmittance [%]. The horizontal axis in FIG. 15 represents wavelength [nm]. A curve 200p represents optical transmission characteristic of p-polarized light incident on the polarization selection and wavelength selection element 14. The curve 200p is shown by a dot-dash line. A curve 200s represents optical transmission characteristic of s-polarized light incident on the polarization selection and wavelength selection element 14. The curve 200s is shown by a dashed line with short dashes.

The curve 200G represents green excited light. The curve 200G is shown by a dashed line with long dashes. A center wavelength of the curve 200G is 550 nm. The green excited light has a non-uniform polarization direction. Thus, a portion of light of s-polarized components on the long wavelength side of 575 nm is reflected by the polarization selection and wavelength selection element 14 and returns to the monochromatic light source groups 1000a, 1000b. The curve 200R represents red excited light. The curve 200R is shown by a dash-dot-dot line. A center wavelength of the curve 200R is 620 nm. The red excited light also has a non-uniform polarization direction. Thus, a portion of light of p-polarized components on the short wavelength side of 610 nm is transmitted by the polarization selection and wavelength selection element 14 and returns to the monochromatic light source groups 1000a, 1000b.

There is a possibility that, regardless of polarization, on the basis of the wavelength characteristics of the polarization selection and wavelength selection element 14 and the relative light intensity curve with respect to wavelength of the excited light, a portion of the excited light may return to the monochromatic light source groups 1000a, 1000b and shorten the lives of the monochromatic light source groups 1000a, 1000b. The wavelength selection elements 44, 54 reflect light on the long wavelength side of 450 nm. Accordingly, they have the further effect of reducing the return of light from the first phosphor layer 16a and the second phosphor layer 16b.

The additional wavelength selection elements 44 and 54 have an optical transmission band that includes both the wavelength band of the first polarized light output from the first monochromatic light source group 1000a and the wavelength band of the second polarized light output from the second monochromatic light source group 1000b. The wavelength selection elements 44 and 54 are disposed on the light path from the first monochromatic light source group 1000a and the second monochromatic light source group 1000b to the polarization selection and wavelength selection element 14.

<First Variation>

Next, a case in which the center wavelength of the light emitted from the first monochromatic light source group 1000a differs from the center wavelength of the light emitted from the second monochromatic light source group 1000b will be described.

When the polarization selection and wavelength selection element 14 has the optical transmission characteristics shown in FIG. 4, a center wavelength of the light emitted from the first monochromatic light source group 1000a is 465 nm. The light emitted from the second monochromatic light source group 1000b is s-polarized light with a center wavelength of 445 nm. The light emitted from the first monochromatic light source group 1000a is transmitted through the polarization selection and wavelength selection element 14 and reaches the first phosphor layer 16a, thereby exciting it to generate red light. In this case, the polarization direction of the light emitted from the first monochromatic light source group 1000a does not matter. The second monochromatic light source group 1000b emits the s-polarized light with the center wavelength of 445 nm. The light emitted from the second monochromatic light source group 1000b is reflected by the polarization selection and wavelength selection element 14 and reaches the second phosphor layer 16b, thereby exciting it to generate green light.

When the polarization selection and wavelength selection element 14 has the optical transmission characteristics shown in FIG. 6, the light emitted from the first monochromatic light source group 1000a is p-polarized light with a center wavelength of 445 nm. A center wavelength of the light emitted from the second monochromatic light source group 1000b is 465 nm. The light emitted from the first monochromatic light source group 1000a is transmitted through the polarization selection and wavelength selection element 14 and reaches the first phosphor layer 16a, where it generates green excited light. The light emitted from the second monochromatic light source group 1000b is reflected by the polarization selection and wavelength selection element 14 and reaches the second phosphor layer 16b, where it generates red excited light. In this case, the polarization direction of the light emitted from the second monochromatic light source group 1000b does not matter.

In general, with respect to the optical transmission characteristics of the polarization selection and wavelength selection element 14, the difference between the (half value) position of 50% optical transmittance of p-polarized light on the short wavelength side and the position of 50% optical transmittance of s-polarized light on the short wavelength side ranges from about 10 nm to 20 nm. Accordingly, when the difference between the center wavelength of the first monochromatic light source group 1000a and the center wavelength of the second monochromatic light source group 1000b is 20 nm or less, the monochromatic light sources on the short wavelength side become capable of making light reach the phosphor layer by use of polarization characteristics, thereby increasing the efficiency of the light.

This enables the occurrence of color mixing to be suppressed without considering variations in polarization and wavelength of the monochromatic light source group with the center wavelength of 465 nm. This means that the polarization direction of the monochromatic light source group with the center wavelength of 465 nm need not be orthogonal or parallel to the polarization axis of the polarization selection and wavelength selection element 14. More precisely speaking, it is not necessary for a majority of the components to be orthogonal or parallel to the polarization axis. For example, a rotational polarization direction (circular polarization) is allowable.

The first variation of the fourth embodiment presents a configuration of the light source device 7 in which light emitted from the first monochromatic light source group 1000a is p-polarized light with a center wavelength of 445 nm and a center wavelength of light emitted from the second monochromatic light source group 1000b is 465 nm. This configuration is applicable to the first, second, or third embodiment. In such cases, it suffices for the polarization selection and wavelength selection element 14 to have the optical transmission characteristics shown in FIG. 6. This enables the occurrence of color mixing to be suppressed without the need to consider the polarization direction of the second monochromatic light source group 1000b.

The first variation of the fourth embodiment also presents a configuration of the light source device 7 in which a center wavelength of the light emitted from the first monochromatic light source group 1000a is 465 nm and the light emitted from the second monochromatic light source group 1000b is s-polarized light with a center wavelength of 445 nm. This type of configuration is applicable to the first, second, or third embodiment. In this case, it suffices for the polarization selection and wavelength selection element 14 to have the optical transmission characteristics shown in FIG. 4.

When the difference between the center wavelengths of the first monochromatic light source group 1000a and the second monochromatic light source group 1000b is greater than 20 nm, it is possible to use only the function of the polarization selection and wavelength selection element 14 as a wavelength selection element to maintain a high light utilization efficiency while suppressing the occurrence of color mixing.

The center wavelength of the second polarized light differs from the center wavelength of the first polarized light. The first polarized light is light output by the first monochromatic light sources 10a. The second polarized light is light output by the second monochromatic light sources 10b.

The optical transmission band of the wavelength selection elements 44, 54 includes the wavelength band of the first polarized light output from the first monochromatic light source group 1000a and the wavelength band of the second polarized light output from the second monochromatic light source group 1000b. Accordingly, when the center wavelength of the light emitted from the first monochromatic light source group 1000a is 445 nm and the center wavelength of the light emitted from the second monochromatic light source group 1000b is 465 nm, it suffices for the wavelength of light that has passed through the wavelength selection element 44 and the wavelength selection element 54 to be within the range from 440 nm to 470 nm. The wavelength selection elements 44, 54 thereby reflect light on the long wavelength side of 470 nm. Accordingly, they have the further effect of suppressing the return of light from the first phosphor layer 16a and the second phosphor layer 16b.

<Second Variation>

Figure 16:
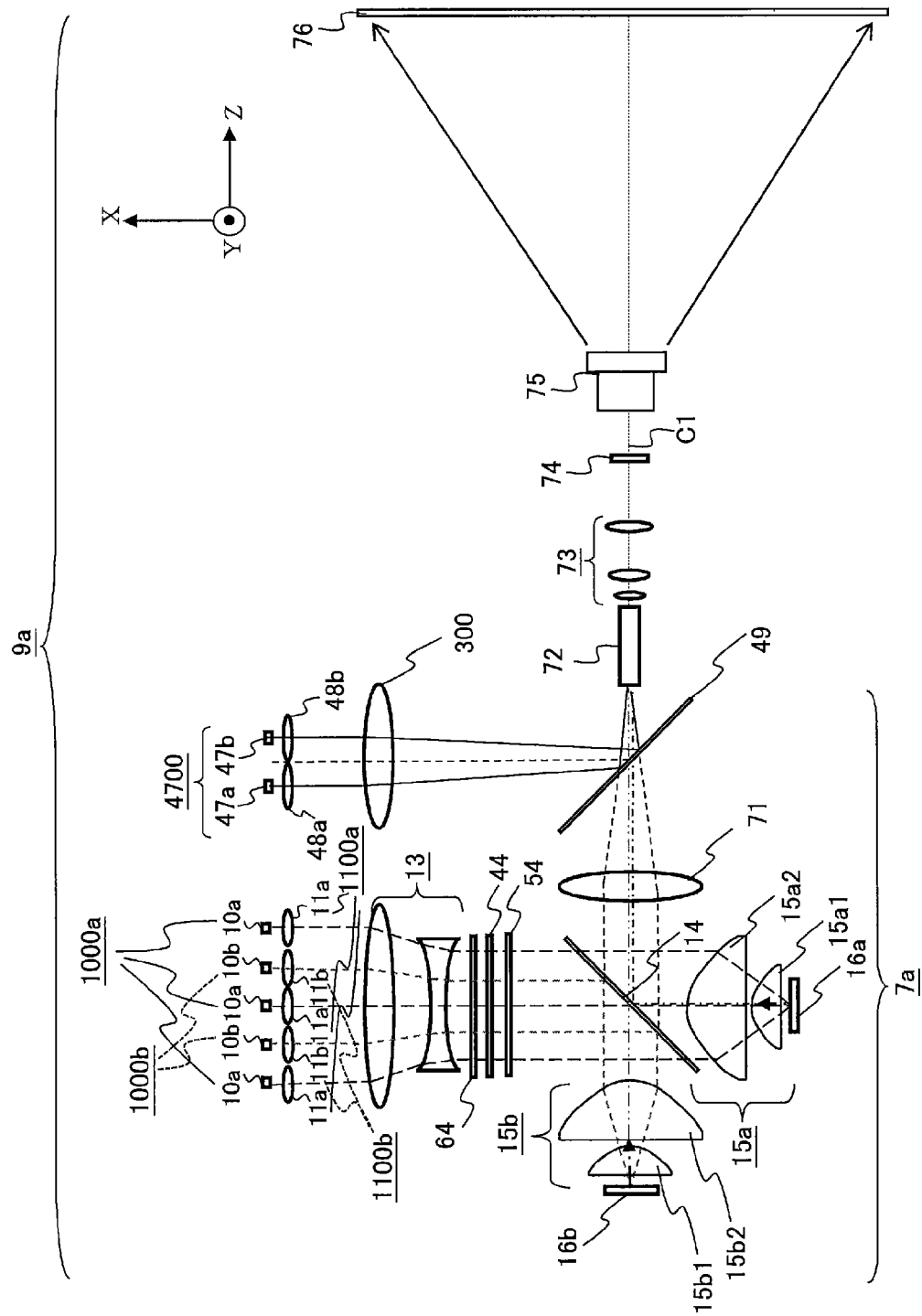
FIG. 16 is a diagram schematically illustrating a variation of the configuration of the light source device and the projection display device according to the fourth embodiment of the invention.

FIG. 16 is a diagram schematically illustrating a configuration of a projection display device 9a in a second variation of the fourth embodiment. The projection display device 9a according to the second variation differs from the projection display device 8 shown in FIG. 11 in that it includes third monochromatic light sources 47a and 47b, third collimating lenses 48a and 48b, and a color separation element (light path alteration element) 49 instead of the third monochromatic light sources 17a and 17b, the third collimating lenses 18a and 18b, and the color separation element 19. The third monochromatic light sources 47a and 47b constitute a third monochromatic light source group 4700. The projection display device 9a in the second variation also differs from the projection display device 8 in FIG. 11, in which the color separation element 19 is disposed between the polarization selection and wavelength selection element 14 and the focusing lens 71, in that the color separation element 49 is disposed between the focusing lens 71 and the light intensity uniformization element 72.

The third monochromatic light sources 47a and 47b are disposed so as to emit a light flux in the negative X-axis direction. The third collimating lenses 48a and 48b are disposed in the negative X-axis direction from the third monochromatic light sources 47a and 47b. The third collimating lenses 48a and 48b collimate the light emitted from the third monochromatic light sources 47a and 47b. A focusing lens 300 is disposed in the negative X-axis direction from the third monochromatic light sources 47a and 47b. The focusing lens 300 focuses the light emitted from the third monochromatic light sources 47a and 47b onto the incidence surface 72a of the light intensity uniformization element 72. Alternatively, the light flux may be directed onto the light intensity uniformization element 72 without use of the focusing lens 300, by making the optical axes of the third collimating lenses 48a and 48b eccentric with respect to the optical axes of the third monochromatic light sources 47a and 47b. The color separation element 49 is disposed in the negative X-axis direction from the focusing lens 300.

The third monochromatic light source group 4700 outputs light in a third wavelength band. The color separation element (light path alteration element) 49 brings the light path of the light in the third wavelength band into coincidence with the common light path shared by the light path of the light in the first wavelength band that has been reflected by the polarization selection and wavelength selection element 14 and the light path of the light in the second wavelength band that has been transmitted through the polarization selection and wavelength selection element 14.

A light source device 7a according to the second variation of the fourth embodiment uses the focusing lens 71 to focus light in the first wavelength band reflected by the polarization selection and wavelength selection element 14 and light in the second wavelength band transmitted through the polarization selection and wavelength selection element 14 onto the light intensity uniformization element 72. The light path altering element 49 is disposed between the focusing lens 71 and the light intensity uniformization element 72, in place of the color separation element 19.

Light fluxes output from the first phosphor layer 16a and the second phosphor layer 16b are focused onto the light intensity uniformization element 72 through the focusing lens 71. Light fluxes emitted from the third monochromatic light sources 47a and 47b are focused onto the light intensity uniformization element 72 via the color separation element 49. Therefore, the light emitted from the third monochromatic light sources 47a and 47b takes a light path differing and independent from that of the light entering the light intensity uniformization element 72 from the polarization selection and wavelength selection element 14. This enables a space between the polarization selection and wavelength selection element 14 and the focusing lens 71 to be reduced. The length in the Z-axis direction is therefore shortened, enabling the device to be more compact. The color separation element 49 has the property of reflecting the light flux in the wavelength band of the third monochromatic light sources 47a and 47b and transmitting the light that enters the light intensity uniformization element 72 from the polarization selection and wavelength selection element 14.

The configuration of the third monochromatic light sources 47a and 47b, the third collimating lenses 48a and 48b, and the color separation element 49 shown in the second variation can be employed in embodiments other than those described above. The projection display device 1 in the first embodiment shown in FIG. 1 can employ the configuration of the third monochromatic light sources 47a and 47b, the third collimating lenses 48a and 48b, and the color separation element 49 described in the second variation instead of the third monochromatic light sources 17a and 17b, the third collimating lenses 18a and 18b, and the color separation element 19. The projection display device 2 in the second embodiment shown in FIG. 7 can employ the above configuration instead of the third monochromatic light sources 27a and 27b, the third collimating lenses 28a and 28b, and the color separation element 29. The projection display device 3 in the third embodiment shown in FIG. 9 can employ the configuration described in the second variation instead of the third monochromatic light sources 37a and 37b, the third collimating lenses 38a and 38b, and the color separation element 39.

The light source device 7a includes the third monochromatic light source group 4700 and the light path altering element 49. The third monochromatic light source group 4700 outputs light in the third wavelength band. The light path altering element 49 brings the light path of the light in the third wavelength band into coincidence with the common light path shared by the light path of light in the first wavelength band that has been reflected by the polarization selection and wavelength selection element 14 and the light path of light in the second wavelength band that has been transmitted through the polarization selection and wavelength selection element 14.

The light source device 7a includes the focusing lens 71 for focusing light in the first wavelength band reflected by the polarization selection and wavelength selection element 14 and light in the second wavelength band transmitted through the polarization selection and wavelength selection element 14 onto the light intensity uniformization element 72. The light path altering element 49 is disposed between the focusing lens 71 and the light intensity uniformization element 72.

<Third Variation>

Figure 17:
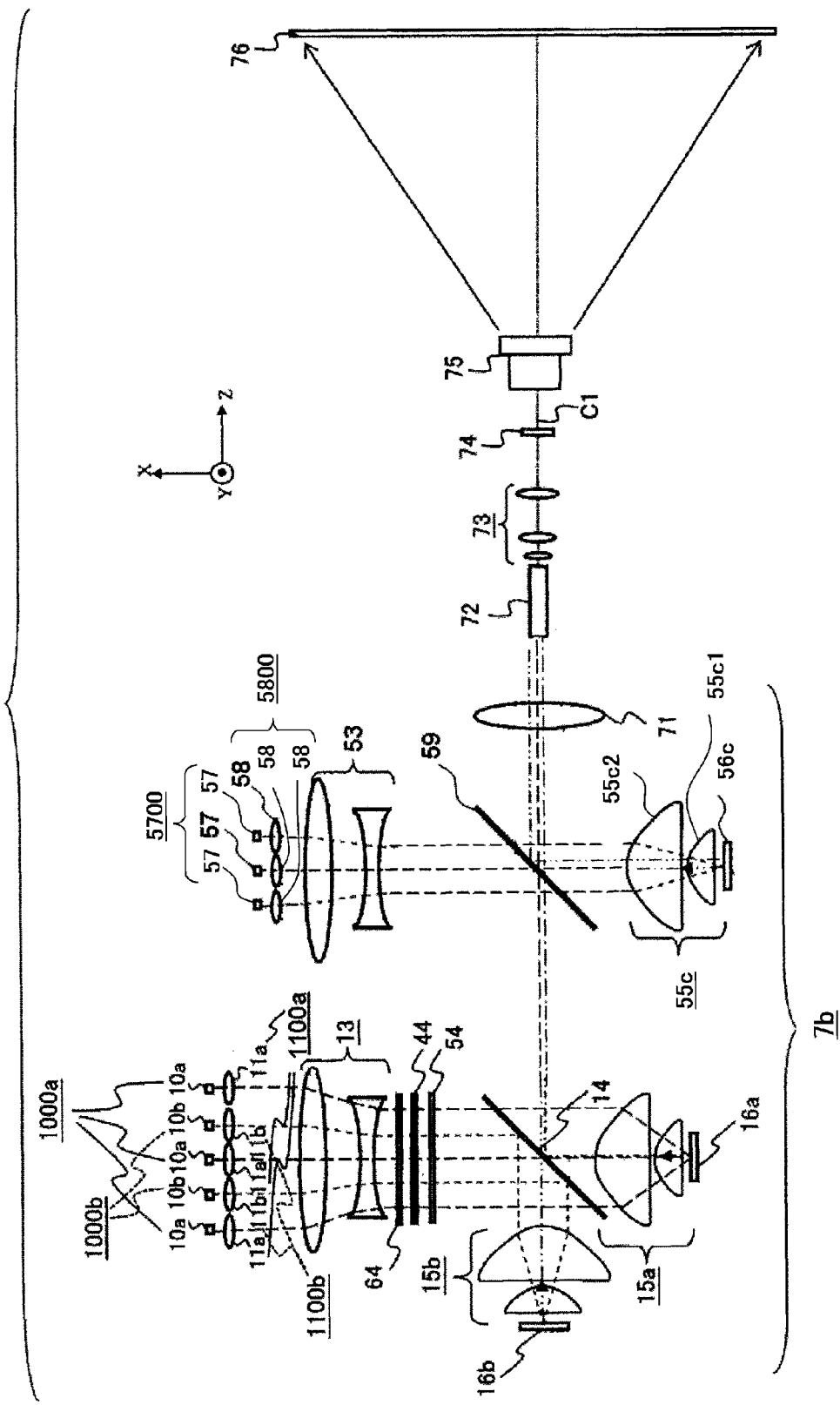
FIG. 17 is a diagram schematically illustrating a variation of the configuration of the light source device and the projection display device according to the fourth embodiment of the invention.

FIG. 17 is a diagram schematically illustrating a configuration of a projection display device 9b in a third variation of the fourth embodiment. The projection display device 9b in the third variation of the fourth embodiment employs a third phosphor layer 56c instead of the blue laser light sources 17a and 17b. The projection display device 9b according to the third variation differs from the projection display device 8 shown in FIG. 11 in that it includes third monochromatic light sources 57, third collimating lenses 58, a lens group 53, a color separation element (light path alteration element) 59, a third focusing lens group 55c, and the third phosphor layer 56c instead of the third monochromatic light sources 17a and 17b, the third collimating lenses 18a and 18b, and the color separation element 19 in the projection display device 8 shown in FIG. 11.

The plurality of third monochromatic light sources 57 constitute a third monochromatic light source group 5700. The third monochromatic light sources 57 are disposed so as to emit light fluxes in the negative X-axis direction. A center wavelength of the third monochromatic light sources 57 is, for example, 405 nm. The third collimating lenses 58 are disposed in correspondence to the third monochromatic light sources 57 in the negative X-axis direction from the third monochromatic light sources 57. That is, one third collimating lens 58 is provided per third monochromatic light source 57. The plurality of third collimating lenses 58 constitute a third collimating lens group 5800. The third collimating lenses 58 convert the light fluxes output from the third monochromatic light sources 57 into collimated light.

The lens group 53 is disposed in the negative X-axis direction from the third collimating lenses 58. Like the lens group 13, the lens group 53 has the functions of reducing the diameter of and collimating the light flux emitted from the third monochromatic light source 57. The lens group 53 includes, for example, a first lens and a second lens. The configuration of the lens group 53, however, is not limited to the example shown in FIG. 17. The lens group 53 may have a single-lens configuration. The lens group 53 may also be configured with three or more lenses. The lens groups 13 and 53 may be omitted from a configuration of a light source device 7b.

Figure 18:
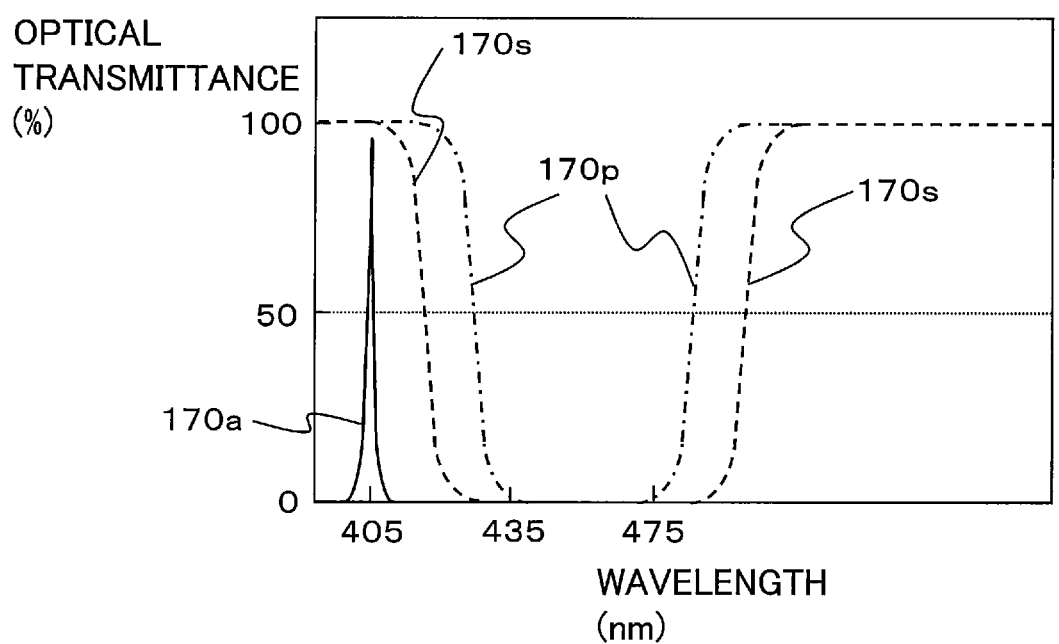
FIG. 18 is a diagram illustrating polarization separation characteristics of a color separation element.

The color separation element 59 is disposed in the negative X-axis direction from the lens group 53. The light collimated after diameter reduction by the lens group 53 is transmitted through the color separation element 59 and propagates in the negative X-axis direction. As shown in FIG. 18, the characteristics of the color separation element 59 differ from those of the color separation elements 19, 49 shown in the fourth embodiment. In FIG. 18, the horizontal axis represents wavelength [nm] of light and the vertical axis represents optical transmittance [%]. A curve 170s in FIG. 18, shown by a dashed line, represents the optical transmission characteristic of s-polarized light. A curve 170p, shown by a dot-dash line, represents the optical transmission characteristic of p-polarized light. The color separation element 59 transmits 90% or more of the light in the wavelength band from 400 nm to 410 nm. The optical transmission characteristic of the color separation element 59 for s-polarized light starts decreasing from, for example, 410 nm (more precisely speaking, near 410 nm) and becomes 0% at 425 nm (more precisely speaking, near 425 nm). The optical transmission characteristic for s-polarized light starts increasing from 490 nm (more precisely speaking, near 490 nm) and becomes 100% at 505 nm (more precisely speaking, near 505 nm). The optical transmission characteristic of p-polarized light of the color separation element 59 starts decreasing from 420 nm (more precisely speaking, near 420 nm), and becomes 0% at 435 nm (more precisely speaking, near 435 nm). The optical transmission characteristic for p-polarized light starts increasing from 475 nm (more precisely speaking, near 475 nm) and becomes 100% at 490 nm (more precisely speaking, near 490 nm).

This enables the color separation element 59 to reflect only light in the blue wavelength band from 435 nm to 475 nm. That is, excitation light, which has a center wavelength of 405 nm, light in the green wavelength band, and light in the red wavelength band pass through the color separation element 59. Light in the blue wavelength band is reflected by the color separation element 59. It is thereby possible to form white light from phosphor light of the three colors of red, green, and blue. An example in which light in the wavelength band from 435 nm to 475 nm is reflected has been shown, but the color separation element 59 may have the property of reflecting light in, for example, the wavelength band from 450 nm to 480 nm.

The third focusing lens group 55c is disposed in the negative X-axis direction from the color separation element 59. The third focusing lens group 55c, in combination with the lens group 53, for example, focuses light that has been collimated after diameter reduction by the lens group 53. The third focusing lens group 55c includes a first focusing lens 55c1 and a second focusing lens 55c2. The first focusing lens 55c1 is the lens nearest the third phosphor layer 56c. The second focusing lens 55c2 is the lens second nearest the third phosphor layer 56c. The configuration of the third focusing lens group 55c, however, is not limited to the example shown in FIG. 17. The third focusing lens group 55c may be configured with a single lens. The third focusing lens group 55c may also be configured with three or more lenses.

The third phosphor layer 56c is disposed in the negative X-axis direction from the third focusing lens group 55c. The light focused by the third focusing lens group 55c enters the third phosphor layer 56c as excitation light. The third phosphor layer 56c is excited by the light focused by the third focusing lens group 55c to emit light in the third wavelength band. The light in the third wavelength band is, for example, light in the blue wavelength band. The light output from the third phosphor layer 56c may be light in the blue wavelength band with a center wavelength of 460 nm. More precisely speaking, it may be light with a center wavelength near 460 nm.

The light in the third wavelength band propagates in the positive X-axis direction. After being reflected by the color separation element 59, the light in the third wavelength band propagates in the positive Z-axis direction. The light in the third wavelength band reflected by the color separation element 59 propagates on the same light path as the common light path shared by the light in the first wavelength band reflected by the polarization selection and wavelength selection element 14 and the light in the second wavelength band transmitted through the polarization selection and wavelength selection element 14. After that, the light in the third wavelength band is focused onto the light intensity uniformization element 72 by the focusing lens 71.

Consequently, the entire light flux reaching the light valve 74 is light that has been excited in the phosphor layers. This produces the further effect of eliminating the need to consider speckle due to laser coherence.

Fifth Embodiment

Figure 19:
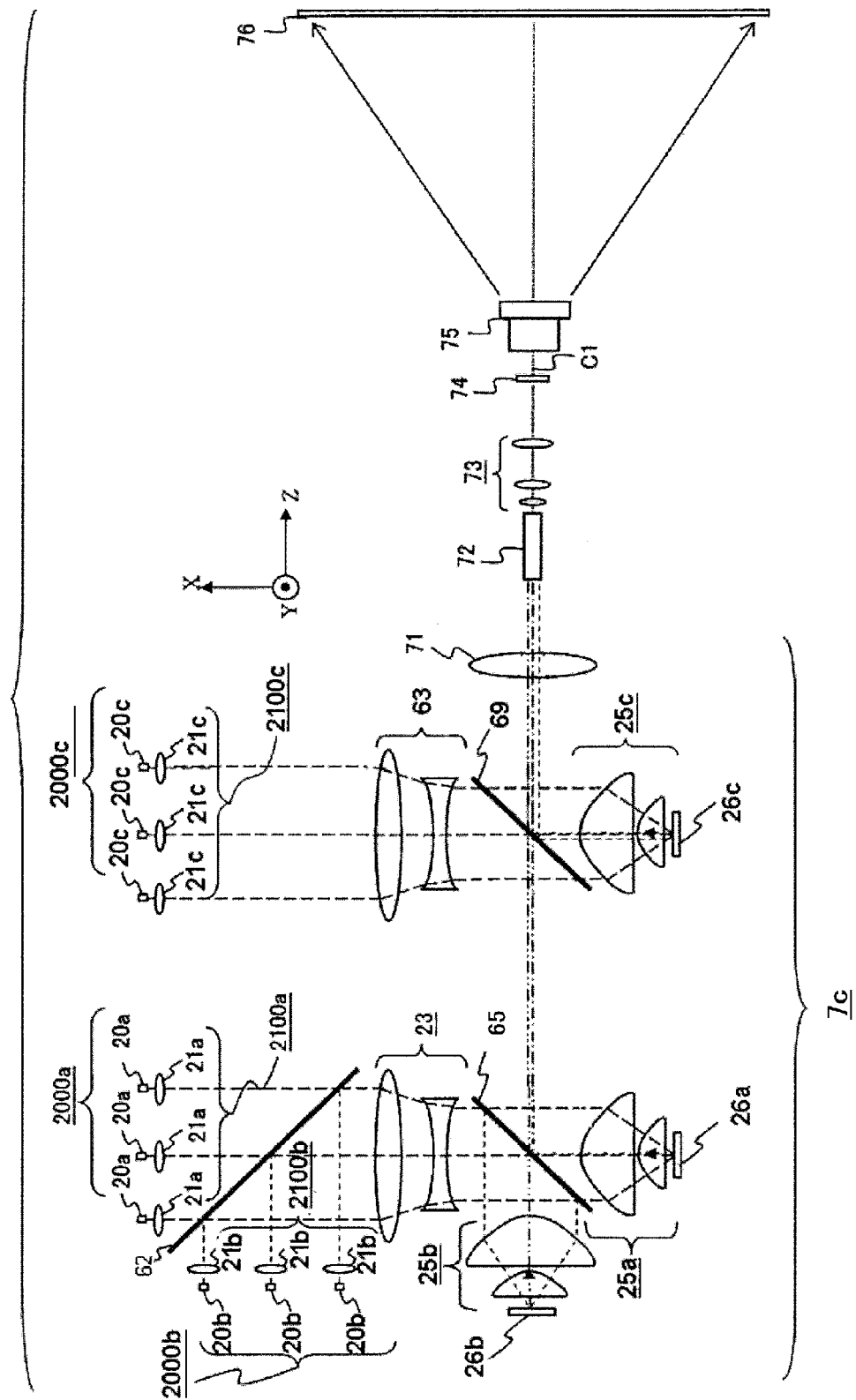
FIG. 19 is a diagram schematically illustrating a configuration of a light source device and a projection display device according to a fifth embodiment of the invention.

FIG. 19 is a diagram schematically illustrating a configuration of a projection display device 90 including a light source device 7c according to a fifth embodiment. To simplify the description, FIG. 9 shows an orthogonal XYZ coordinate system. The X-axis direction is the vertical direction in FIG. 19. The down-to-up direction in FIG. 9 is the positive X-axis direction; the up-to-down direction is the negative X-axis direction. A lens group 23, a color separation element 62, first collimating lenses 21a, second collimating lenses 21b, first monochromatic light sources 20a, and second monochromatic light sources 20b are disposed on the positive X-axis side of a color separation element 65. The Y-axis direction is the direction perpendicular to the drawing sheet on which FIG. 19 is depicted. The positive Y-axis direction is the direction from the reverse side (back side) to the front side of the drawing sheet; the negative Y-axis direction is the direction from the front side to the reverse side (back side) of the drawing sheet. The Z-axis direction is the horizontal direction in FIG. 19. The left-to-right direction in FIG. 19 is the positive Z-axis direction; the right-to-left direction is the negative Z-axis direction. A color separation element 69, a focusing lens 71, a light intensity uniformization element 72, a relay lens group 73, an image display element 74, projection optics 75, and a screen 76 are disposed on the positive Z-axis side of the color separation element 65.

The light source device 7c according to the fifth embodiment differs from the light source device 5 in the second embodiment in that it uses the color separation element 69, a third focusing lens group 25c, and a third phosphor layer 26c instead of the color separation element 29, the third collimating lenses 28a and 28b, and the third monochromatic light sources 27a and 27b, replaces the polarization selection element 22 with the color separation element 62, and replaces the polarization selection and wavelength selection element 24 with the color separation element 65. The light source device 7c differs from the light source device 5 in that it further includes third collimating lenses 21c and third monochromatic light sources 20c.

In FIG. 19, components that are the same as components shown in FIG. 7 (in the second embodiment) are given the same reference characters and descriptions are omitted. The components that are the same as components in the second embodiment are a first monochromatic light source group 2000a, a second monochromatic light source group 2000b, a first collimating lens group 2100a, a second collimating lens group 2100b, the lens group 23, a first focusing lens group 25a, a second focusing lens group 25b, a first phosphor layer 26a, a second phosphor layer 26b, the focusing lens 71, the light intensity uniformization element 72, the relay lens group 73, the image display element 74, the projection optics 75, and the screen 76. In the second embodiment, however, the second monochromatic light sources 20b, the second monochromatic light source group 2000b, the second collimating lenses 21b, the second collimating lens group 2100b, the second focusing lens group 25b, the second phosphor layer 26b, and the lens group 23 had characteristics adapted for green light when the polarization selection and wavelength selection element 24 in FIG. 4 was used; in the fifth embodiment their characteristics will be described as adapted for blue light. As set forth later, the characteristics of the color separation element 65 differ from the characteristics of the polarization selection and wavelength selection element 24 in FIG. 4.

The projection display device 90 according to the fifth embodiment includes the light source device 7c, the light intensity uniformization element 72, the image display element or the light valve 74, and the projection optics 75 as shown in FIG. 19. The projection display device 90 may also include the focusing lens 71, the relay lens group 73, and the screen 76. The light source device 7c according to the fifth embodiment includes the first monochromatic light source group 2000a, the second monochromatic light source group 2000b, the color separation element 65, the first phosphor layer 26a, and the second phosphor layer 26b as shown in FIG. 19. The light source device 7c may also include a third monochromatic light source group 2000c, the color separation element 69, the third phosphor layer 26c, and the color separation element 62. In addition, the light source device 7c according to the fifth embodiment may include the first collimating lens group 2100a, the second collimating lens group 2100b, a third collimating lens group 2100c, lens groups 23 and 63, the first focusing lens group 25a, the second focusing lens group 25b, and the third focusing lens group 25c.

The third phosphor layer 26c is disposed at the position of the third monochromatic light sources 27a and 27b. The third focusing lens group 25c is disposed at the position of the third collimating lenses 28a and 28b.

The polarization and polarization direction of light emitted from the first monochromatic light sources 20a, light emitted from the second monochromatic light sources 20b, and light emitted from the third monochromatic light sources 20c do not matter. That is, the light output from the first monochromatic light sources 20a, the light output from the second monochromatic light sources 20b, and the light output from the third monochromatic light sources 20c may be s-polarized light, p-polarized light, or elliptically polarized light. The first light sources 20a are excitation light sources with a center wavelength of 460 nm, used for the color red. The second light sources 20b are excitation light sources with a center wavelength of 405 nm, used for the color blue. The third light sources 20c are excitation light sources with a center wavelength of 445 nm, used for the color green. The center wavelength of the first light sources 20a may be 445 nm, but this embodiment will describe the case of 460 nm.

The color separation element 62 has the function of transmitting the light emitted by the first light sources 20a with a center wavelength of 460 nm. The color separation element 62 also has the function of reflecting the light emitted by the second light sources 20b with a center wavelength of 405 nm. For example, the color separation element 62 has characteristics similar to the characteristics shown in FIG. 4 at wavelengths equal to 500 nm or less. That is, the color separation element 62 has characteristics that reflect light with a center wavelength of 405 nm and transmit light of a center wavelength of 460 nm, regardless of the polarization direction. It may have the same characteristics as in FIG. 4, but 500 nm or less was mentioned here because it is the characteristics on the short wavelength side that are important.

The light emitted by the first light sources 20a is output in the negative X-axis direction. The light emitted from the first light sources 20a is collimated by the first collimating lenses 21a. After that, the light emitted from the first light sources 20a is transmitted through the color separation element 62 and becomes collimated light with a light flux diameter reduced by the lens group 23. The light emitted from the first light sources 20a is then transmitted through the color separation element 65. After being transmitted through the color separation element 65, the light flux emitted from the first light sources 20a is focused onto the first phosphor layer 26a for the color red by the first focusing lens group 25a.

The light emitted by the second light sources 20b is output in the positive Z-axis direction. The light emitted from the second light sources 20b is collimated by the second collimating lenses 21b. After that, it is reflected by the color separation element 62, propagates in the negative X-axis direction, and becomes collimated light with a light flux diameter reduced by the lens group 23. The light emitted from the second light sources 20b is then reflected in the negative Z-axis direction by the color separation element 65. After being reflected by the color separation element 65, the light flux emitted from the second light sources 20b is focused onto the second phosphor layer 26b for the color blue by the second focusing lens group 25b.

The color separation element 65 has the property of transmitting light in a blue wavelength band and the property of reflecting red light. The color separation element 65 displays, for example, the same optical transmission characteristics as in FIG. 4. The term 'light in a blue wavelength band' here denotes light with a wavelength from 450 nm to 480 nm. The term 'light in a red wavelength band' denotes light with a wavelength from 585 nm to 630 nm. The term 'light in a green wavelength band' denotes light with a wavelength from 500 nm to 580 nm.

The light emitted from the first phosphor layer 26a for the color red propagates in the positive X-axis direction, is reflected in the positive Z-axis direction by the color separation element 65, and propagates toward the color separation element 69. The light emitted from the second phosphor layer 26b for the color blue propagates in the positive Z-axis direction, passes through the color separation element 65, and propagates toward the color separation element 69. The light emitted from the first phosphor layer 26a for the color red and reflected by the color separation element 65 and the light emitted from the second phosphor layer 26b for the color blue and transmitted through the color separation element 65 propagate on a common light path.

Figure 20:
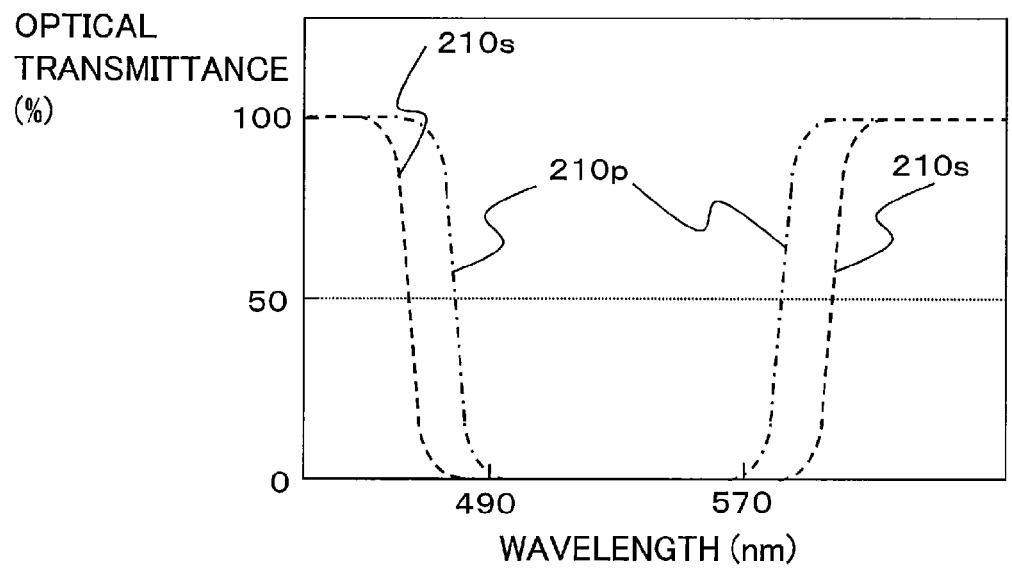
FIG. 20 is a diagram illustrating wavelength selection characteristic of a color separation element.

The color separation element 69 transmits light in the blue wavelength band and light in the red wavelength band. The color separation element 69 also reflects light in the green wavelength band. FIG. 20 is a diagram illustrating the wavelength selection characteristics of the color separation element 69. In FIG. 20, the horizontal axis represents wavelength [nm] of light and the vertical axis represents optical transmittance [%]. A curve 210s in FIG. 20, shown by a dashed line, represents the optical transmission characteristic for s-polarized light. A curve 210p, shown by a dot-dash line, shows the optical transmission characteristic for p-polarized light. For s-polarized light, for example, as shown in FIG. 20, the optical transmittance decreases from a wavelength of 465 nm (more precisely speaking, near 465 nm) and becomes 0% at a wavelength of 480 nm (more precisely speaking, near 480 nm). The optical transmittance characteristic for s-polarized light also starts increasing from a wavelength of 585 nm (more precisely speaking, near 585 nm) and becomes 100% at a wavelength of 600 nm (more precisely speaking, near 600 nm). For p-polarized light, the optical transmittance decreases from a wavelength of 475 nm (more precisely speaking, near 475 nm) and becomes 0% at a wavelength of 490 nm (more precisely speaking, near 490 nm). The optical transmittance for p-polarized light also starts increasing from a wavelength of 570 nm (more precisely speaking, near 570 nm) and becomes 100% at a wavelength of 585 nm (more precisely speaking, near 585 nm). Light in the red wavelength band and light in the blue wavelength band pass through the color separation element 69 and proceed toward the focusing lens 71.

A light flux in the green wavelength band is emitted from the third phosphor layer 26c. The third phosphor layer 26c is disposed on the negative X-axis side of the color separation element 69. The excitation light sources of the third phosphor layer 26c are the third monochromatic light sources 20c. The third monochromatic light sources 20c are disposed on the positive X-axis side of the color separation element 69. A center wavelength of the third monochromatic light sources 20c is 445 nm. The third monochromatic light sources 20c output light in the negative X-axis direction. The output light is collimated by the third collimating lenses 21c. The flux diameter of the collimated light flux is reduced by a lens group 63.

The lens group 63 includes, for example, a first lens and a second lens. The configuration of the lens group 63, however, is not limited to the example shown in FIG. 19. The lens group 63 may be configured with a single lens. The lens group 63 may also be configured with three or more lenses. The light source device 7c may be configured without the lens group 63.

The collimated light with the reduced flux diameter propagates toward the color separation element 69. The collimated light with the reduced flux diameter is transmitted through the color separation element 69. After that, the collimated light with the reduced light flux diameter is focused by the third focusing lens group 25c onto the third phosphor layer 26c for the color green. The focused light excites the third phosphor layer 26c. The third phosphor layer 26c outputs green light in the positive X-axis direction.

The light in the green wavelength band is collimated by the third focusing lens group 25c, reflected by the color separation element 69, and then propagates in the positive Z-axis direction. The light in the green wavelength band reflected by the color separation element 69 propagates on the same light path as the light in the red wavelength band reflected by the color separation element 65 and the light in the blue wavelength band transmitted through color separation element 65. After that, the green light propagates toward the focusing lens 71.

The configuration following (on the positive Z-axis side of) the focusing lens 71 is the same as in FIG. 7, so a description will be omitted. The first monochromatic light sources 20a and the second monochromatic light sources 20b may be arranged in the same way as the light sources in the first embodiment. In that case, the color separation element 62 is replaced with a light reflecting element (light reflecting mirror) 12.

As described above, regardless of the polarization directions of the light sources, it becomes possible to generate light in a red wavelength band, light in a green wavelength band, and light in a blue wavelength band from phosphor layers. This eliminates effect of speckle-like brightness irregularities that occur due to laser coherence. Furthermore, since time division driving is not required, each color can be turned on without temporal constraints. As in the first embodiment, the positions of the second phosphor layer 26b for the color blue and the first phosphor layer 26a for the color red may be interchanged. In that case, the color separation element 65 has wavelength characteristics that reflect light emitted from the second monochromatic light sources 20b for the color red, transmit light emitted from the first monochromatic light sources 20a for the color blue, reflect light emitted from the first phosphor layer 26a for the color blue, and transmit light emitted by the second phosphor layer 26b for the color red. In short, it suffices for the color separation element 65 to have characteristics similar to the characteristics in FIG. 18.

The fifth embodiment uses the first light sources 20a as an excitation light source for the color red and the third light sources 20c as an excitation light source for the color green. It is also possible, however, to give the first light sources 20a a center wavelength of 445 nm and use the first light sources 20a as an excitation light source for the color green. In that case, the color separation element 62 has the property of reflecting light with a center wavelength of 405 nm and transmitting light with a center wavelength of 445 nm. It suffices for the color separation element 65 to reflect light with a center wavelength of 405 nm, transmit light with a center wavelength of 445 nm, transmit light in the blue wavelength band, and reflect light in the green wavelength band. For example, the color separation elements 62 and 65 may have the characteristics shown in FIG. 21.

Figure 21:
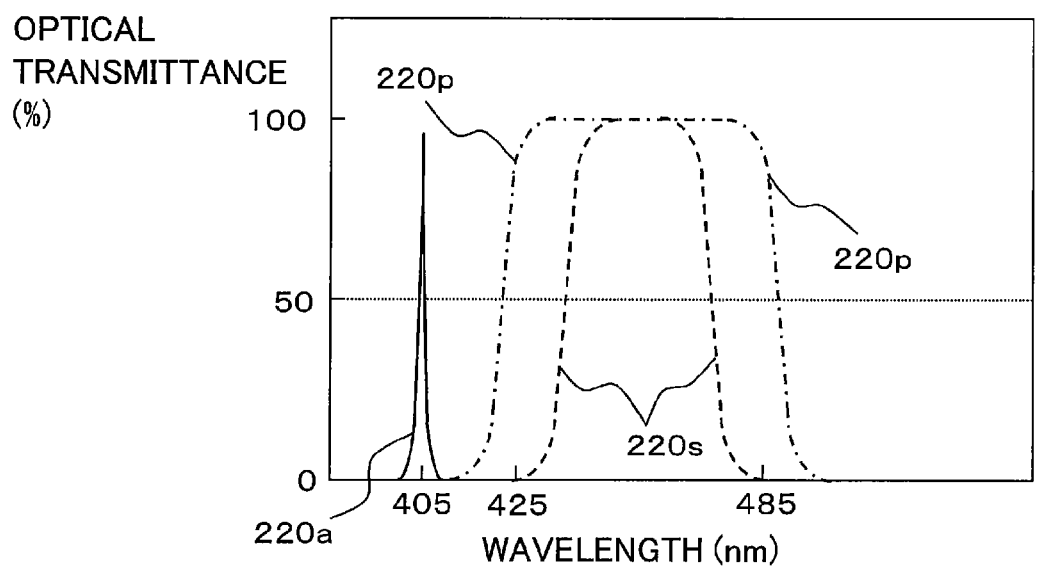
FIG. 21 is a diagram illustrating wavelength selection characteristic of a color separation element.

FIG. 21 is a diagram illustrating the wavelength selection characteristics of the color separation element. In FIG. 21, the horizontal axis represents wavelength [nm] of light and the vertical axis represents optical transmittance [%]. A curve 220s, shown by a dashed line, represents the optical transmission characteristic for s-polarized light. A curve 220p, shown by a dot-dash line, represents the optical transmission characteristic for p-polarized light. For s-polarized light, the optical transmittance increases from a wavelength of 425 nm (more precisely speaking, near 425 nm) and becomes 100% at a wavelength of 440 nm (more precisely speaking, near 440 nm). The optical transmittance characteristic for s-polarized light also starts decreasing from a wavelength of 470 nm (more precisely speaking, near 470 nm) and becomes 0% at a wavelength of 485 nm (more precisely speaking, near 485 nm). For p-polarized light, the optical transmittance increases from a wavelength of 415 nm (more precisely speaking, near 415 nm) and becomes 100% at a wavelength of 430 nm (more precisely speaking, 430 nm). The optical transmittance characteristic for p-polarized light also starts decreasing from a wavelength of 485 nm (more precisely speaking, near 485 nm) and becomes 0% at a wavelength of 500 nm (more precisely speaking, near 500 nm). That is, it reflects light with a center wavelength of 405 nm, transmits light with a center wavelength of 445 nm, transmits light in the blue wavelength band (450 nm to 480 nm) and reflects light in the green wavelength band (500 nm to 580 nm).

The first phosphor layer 26a emits green light and the third phosphor layer 26c emits red light. Accordingly, since the third light sources 20c become the excitation light source for the color red, it is necessary to take the characteristics of the color separation element 69 into consideration. In this case, the center wavelength of the third light sources 20c is 445 nm or 460 nm. The color separation element 69 must have characteristics such that light in the red wavelength band is reflected and light in the blue and green wavelength bands is transmitted. Accordingly, the color separation element 69 may have the characteristics shown in FIG. 22.

Figure 22:
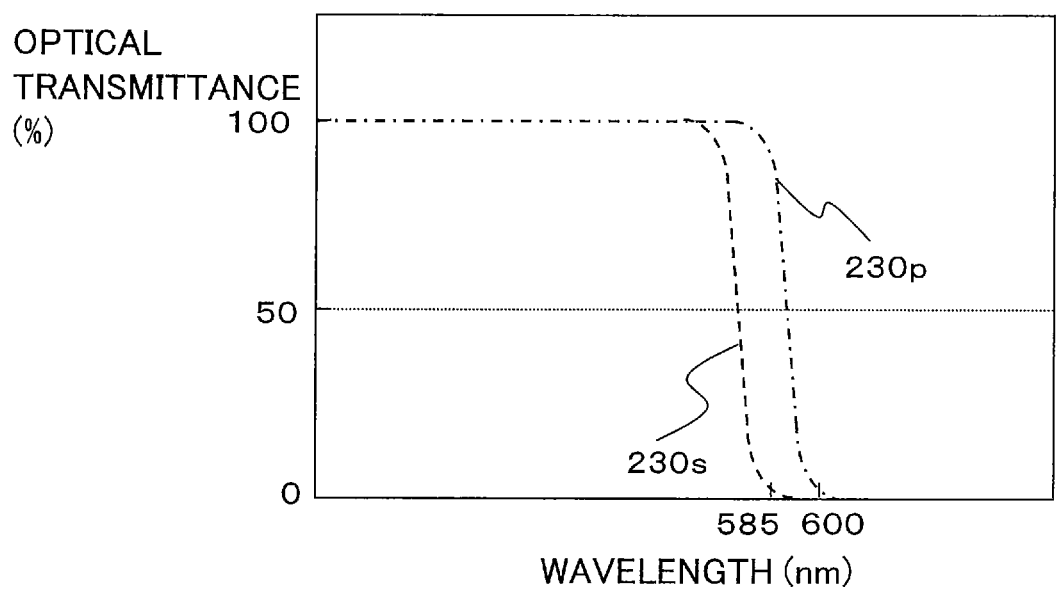
FIG. 22 is a diagram illustrating wavelength selection characteristic of a color separation element.

FIG. 22 is a diagram illustrating the wavelength selection characteristics of the color separation element. In FIG. 22, the horizontal axis represents wavelength [nm] of light and the vertical axis represents optical transmittance [%]. A curve 230s, shown by a dashed line, represents the optical transmittance characteristic for s-polarized light. A curve 230p, shown by a dot-dash line, represents the optical transmission characteristic for p-polarized light. The optical transmittance characteristic for s-polarized light starts decreasing from a wavelength of 570 nm (more precisely speaking, near 570 nm) and becomes 0% at a wavelength of 585 nm (more precisely speaking, near 585 nm). The optical transmittance characteristic for p-polarized light starts decreasing from a wavelength of 585 nm (more precisely speaking, near 585 nm) and becomes 0% at a wavelength of 600 nm (more precisely speaking, near 600 nm). This enables the color separation element 69 to reflect only light in the red wavelength band.

Thus the difference between the center wavelength of 405 nm of the excitation light sources 20b for the color blue and the center wavelength of 445 nm of the excitation light sources 20a for the color green is 40 nm. Consequently, it is possible to separate light from the excitation light sources 20b for the color blue from light from the excitation light sources 20a for the color green by use of the color separation element 65 even without taking the difference between the optical transmission characteristic of the s-polarized light and the optical transmission characteristic of the p-polarized light into consideration. In order to mitigate polarization effects, the difference in center wavelength between the excitation light sources is preferably at least 30 nm or more here.

The light source device 7c includes the first monochromatic light source group 2000a, the second monochromatic light source group 2000b, the wavelength selection element 65, the first phosphor layer 26a, and the second phosphor layer 26b. The first monochromatic light source group 2000a outputs first light. The second monochromatic light source group 2000b outputs second light with a different center wavelength from the first light. The first phosphor layer 26a is excited and thereby emits light in a first wavelength band. The second phosphor layer 26b is excited and thereby emits light in a second wavelength band. The wavelength selection element 65 transmits the first light, thereby directing the first light onto the first phosphor layer 26a. The wavelength selection element 65 reflects the second light, thereby directing the second light onto the second phosphor layer 26b. The wavelength selection element 65 reflects the light in the first wavelength band emitted from the first phosphor layer 26a. The wavelength selection element 65 transmits the light in the second wavelength band emitted from the second phosphor layer 26b. The wavelength selection element 65 causes the reflected light in the first wavelength band and the transmitted light in the second wavelength band to propagate on a shared light path. One of the first phosphor layer 26a and the second phosphor layer is a phosphor layer emitting blue light. A 'wavelength selection element' is a 'color separation element'.

The case of linear polarization of the first monochromatic light sources 10a, 20a, 30a and the second monochromatic light sources 10b, 20b, 30b has been described in the first, second, third, and fourth embodiments. However, the same effect is also obtained with elliptical polarization, in which components orthogonal or parallel to the polarization axis are in the majority. Here, 'the majority' denotes, for example, 80% or more.

Although embodiments of the invention have been described above, the invention is not limited to these embodiments.

EXPLANATION OF REFERENCE CHARACTERS 1, 2, 3, 8, 9, 90 projection display device, 4, 5, 6, 7, 7a, 7b, 7c light source device, 10a, 20a, 30a first monochromatic light source, 1000a, 2000a, 3000a first monochromatic light source group, 10b, 20b, 30b second monochromatic light source, 1000b, 2000b, 3000b second monochromatic light source group, 11a, 21a, 31a first collimating lens, 1100a, 2100a, 3100a first collimating lens group, 11b, 21b, 31b second collimating lens, 1100b, 2100b, 3100b second collimating lens group, 2100c, 5800 third collimating lens group, 12, 32 light reflecting element, 22 polarization selection element, 13, 23, 33, 53, 63 lens group, 14, 24, 34 polarization selection and wavelength selection element, 15a, 25a, 35a first focusing lens group, 15b, 25b, 35b second focusing lens group, 25c, 55c third focusing lens group, 16a, 26a, 36a first phosphor layer, 16b, 26b, 36b second phosphor layer, 26c, 56c third phosphor layer, 17a, 17b, 27a, 27b, 37a, 37b, 47a, 47b, 20c, 57 third monochromatic light source, 1700, 2000c, 2700, 3700, 4700, 5700 third monochromatic light source group, 18a, 18b, 28a, 28b, 38a, 38b, 48a, 48b, 21c, 58 third collimating lens, 19, 29, 39, 49, 59, 62, 65, 69 color separation element (light path alteration element), 44, 54 wavelength selection element, 64 light diffusion element, 71 focusing lens, 72 light intensity uniformization element, 72a incidence surface, 72b exit surface, 72aV vertical dimension of incidence surface, 72aH horizontal dimension of incidence surface, 73 relay lens group, 74 light valve (image display element), 75 projection optics, 76 screen, 80 lens array group, 80a first lens array, 80b second lens array, 81 lens, 80a1, 80b1 lens cell, 130a, 130b, 140, 170a, 170p, 170s, 200, 200p, 200s, 201p, 201s, 210p, 210s, 220p, 220a, 220s, 230p, 230s, 400a, 400p, 400s, 200R, 200G curve, 1200 light ray, 120 reflecting element, 300 focusing lens, W1, W2, W3, W4, W5 wavelength band, V vertical dimension, H horizontal dimension.

What is claimed is:

1. A light source device comprising:
a first monochromatic light source group for outputting first monochromatic light;
a second monochromatic light source group for outputting second monochromatic light having a shorter center wavelength than a center wavelength of the first monochromatic light;
a first selection element;
a first phosphor layer for emitting light in a first wavelength band when excited; and
a second phosphor layer for emitting light in a second wavelength band having a shorter center wavelength than a center wavelength of the light in the first wavelength band when excited; wherein
the first selection element
 directs the first monochromatic light onto the first phosphor layer by transmitting the first monochromatic light and reflects the light in the first wavelength band emitted from the first phosphor layer, and directs the second monochromatic light onto the second phosphor layer by reflecting the second monochromatic light and transmits the light in the second wavelength band emitted from the second phosphor layer, or
 directs the first monochromatic light onto the first phosphor layer by reflecting the first monochromatic light and transmits the light in the first wavelength band emitted from the first phosphor layer, and directs the second monochromatic light onto the second phosphor layer by transmitting the second monochromatic light and reflects the light in the second wavelength band emitted from the second phosphor layer.

2. The light source device of claim 1, wherein
the first selection element is a polarization selection element, and
the second monochromatic light is polarized light.

3. The light source device of claim 1, wherein
the first selection element is a wavelength selection element, and
the second phosphor layer is a phosphor layer that emits blue light.

4. The light source device of claim 1, further comprising a wavelength selection element having an optical transmission band including both a wavelength band of the first monochromatic light output from the first monochromatic light source group and a wavelength band of the second monochromatic light output from the second monochromatic light source group, wherein
the wavelength selection element is disposed on a light path from the first monochromatic light source group and the second monochromatic light source group to the first selection element.

5. The light source device of claim 1, further comprising a lens array group including a first lens array including a plurality of first lens cells aligned in an array and a second lens array including a plurality of second lens cells aligned in an array and receiving light output from the first lens array, wherein
the first lens array is disposed on a common light path shared by a light path of the first monochromatic light between the first monochromatic light source group and the first selection element and a light path of the second monochromatic light between the second monochromatic light source group and the first selection element, and
an incidence surface of the first lens array is in a conjugate relationship with the first phosphor layer and the second phosphor layer.

6. The light source device of claim 1, further comprising:
a third monochromatic light source for outputting light in a third wavelength band; and
a light path altering element for making a light path of the light in the third wavelength band identical to a common light path shared by a light path of the light in the first wavelength band reflected by the first selection element and a light path of the light in the second wavelength band transmitted by the first selection element, or
for making a light path of the light in the third wavelength band identical to a common light path shared by a light path of the light in the first wavelength band transmitted by the first selection element and a light path of the light in the second wavelength band reflected by the first selection element.

7. The light source device of claim 2, further comprising a second selection element for directing a direction of propagation of the first monochromatic light and a direction of propagation of the second monochromatic light toward the first selection element by transmitting one and reflecting the other one of the first monochromatic light and the second monochromatic light.

8. The light source device of claim 7, wherein optical transmission characteristics of the first selection element indicating variations in optical transmittance with respect to wavelength and optical transmission characteristics of the second selection element indicating variations in optical transmittance with respect to wavelength are equal to each other.

9. The light source device of claim 2, further comprising a wavelength selection element having an optical transmission band including both a wavelength band of the first monochromatic light output from the first monochromatic light source group and a wavelength band of the second monochromatic light output from the second monochromatic light source group, wherein
the wavelength selection element is disposed on a light path from the first monochromatic light source group and the second monochromatic light source group to the first selection element.

10. The light source device of claim 7, further comprising a wavelength selection element having an optical transmission band including both a wavelength band of the first monochromatic light output from the first monochromatic light source group and a wavelength band of the second monochromatic light output from the second monochromatic light source group, wherein
the wavelength selection element is disposed on a light path from the first monochromatic light source group and the second monochromatic light source group to the first selection element.

11. The light source device of claim 2, further comprising a lens array group including a first lens array including a plurality of first lens cells aligned in an array and a second lens array including a plurality of second lens cells aligned in an array and receiving light output from the first lens array, wherein
the first lens array is disposed on a common light path shared by a light path of the first monochromatic light between the first monochromatic light source group and the first selection element and a light path of the second monochromatic light between the second monochromatic light source group and the first selection element, and an incidence surface of the first lens array is in a conjugate relationship with the first phosphor layer and the second phosphor layer.

12. The light source device of claim 7, further comprising a lens array group including a first lens array including a plurality of first lens cells aligned in an array and a second lens array including a plurality of second lens cells aligned in an array and receiving light output from the first lens array, wherein the first lens array is disposed on a common light path shared by a light path of the first monochromatic light between the first monochromatic light source group and the first selection element and a light path of the second monochromatic light between the second monochromatic light source group and the first selection element, and an incidence surface of the first lens array is in a conjugate relationship with the first phosphor layer and the second phosphor layer.

13. The light source device of claim 3, further comprising a second selection element for directing a direction of propagation of the first monochromatic light and a direction of propagation of the second monochromatic light toward the first selection element by transmitting one and reflecting the other one of the first monochromatic light and the second monochromatic light.

14. The light source device of claim 13, wherein optical transmission characteristics of the first selection element indicating variations in optical transmittance with respect to wavelength and optical transmission characteristics of the second selection element indicating variations in optical transmittance with respect to wavelength are equal to each other.

15. The light source device of claim 3, further comprising a wavelength selection element having an optical transmission band including both a wavelength band of the first monochromatic light output from the first monochromatic light source group and a wavelength band of the second monochromatic light output from the second monochromatic light source group, wherein the wavelength selection element is disposed on a light path from the first monochromatic light source group and the second monochromatic light source group to the first selection element.

16. The light source device of claim 13, further comprising a wavelength selection element having an optical transmission band including both a wavelength band of the first monochromatic light output from the first monochromatic light source group and a wavelength band of the second monochromatic light output from the second monochromatic light source group, wherein the wavelength selection element is disposed on a light path from the first monochromatic light source group and the second monochromatic light source group to the first selection element.

17. The light source device of claim 3, further comprising a lens array group including a first lens array including a plurality of first lens cells aligned in an array and a second lens array including a plurality of second lens cells aligned in an array and receiving light output from the first lens array, wherein the first lens array is disposed on a common light path shared by a light path of the first monochromatic light between the first monochromatic light source group and the first selection element and a light path of the second monochromatic light between the second monochromatic light source group and the first selection element, and an incidence surface of the first lens array is in a conjugate relationship with the first phosphor layer and the second phosphor layer.

18. The light source device of claim 13, further comprising a lens array group including a first lens array including a plurality of first lens cells aligned in an array and a second lens array including a plurality of second lens cells aligned in an array and receiving light output from the first lens array, wherein the first lens array is disposed on a common light path shared by a light path of the first monochromatic light between the first monochromatic light source group and the first selection element and a light path of the second monochromatic light between the second monochromatic light source group and the first selection element, and an incidence surface of the first lens array is in a conjugate relationship with the first phosphor layer and the second phosphor layer.

19. A light source device comprising:

a first monochromatic light source group for outputting first polarized light with a fixed polarization direction;

a second monochromatic light source group for outputting second polarized light with a fixed polarization direction;

a polarization selection and wavelength selection element for selecting the first polarized light and the second polarized light;

a first phosphor layer for emitting light in a first wavelength band when excited; and a second phosphor layer for emitting light in a second wavelength band when excited; wherein the polarization selection and wavelength selection element directs the first polarized light onto the first phosphor layer by transmitting the first polarized light and directs the second polarized light onto the second phosphor layer by reflecting the second polarized light, and reflects the light in the first wavelength band emitted from the first phosphor layer and transmits the light in the second wavelength band emitted from the second phosphor layer, and the light source device further comprises a lens array group including a first lens array including a plurality of first lens cells aligned in an array and a second lens array including a plurality of second lens cells aligned in an array and receiving light output from the first lens array, wherein the first lens array is disposed on a common light path shared by a light path of the first polarized light between the first monochromatic light source group and the polarization selection and wavelength selection element and a light path of the second polarized light between the second monochromatic light source group and the polarization selection and wavelength selection element, and an incidence surface of the first lens array is in a conjugate relationship with the first phosphor layer and the second phosphor layer.

20. A light source device comprising:

a first monochromatic light source group for outputting first light;

a second monochromatic light source group for outputting second light having a different center wavelength than a center wavelength of the first light;

a wavelength selection element;

a first phosphor layer for emitting light in a first wavelength band when excited; and a second phosphor layer for emitting light in a second wavelength band when excited; wherein the wavelength selection element directs the first light onto the first phosphor layer by transmitting the first light and directs the second light onto the second phosphor layer by reflecting the second light, and reflects the light in the first wavelength band emitted from the first phosphor layer and transmits the light in the second wavelength band emitted from the second phosphor layer, the reflected light in the first wavelength band and the transmitted light in the second wavelength band have a common light path, and one of the first phosphor layer and the second phosphor layer is a phosphor layer that emits blue light.

* * * * *